(12) United States Patent
Lee

(10) Patent No.: US 11,365,753 B2
(45) Date of Patent: Jun. 21, 2022

(54) SEALED COUPLING FASTENER ASSEMBLIES

(71) Applicant: ILLINOIS TOOL WORKS INC., Glenview, IL (US)

(72) Inventor: Joel Robert Lee, Peotone, IL (US)

(73) Assignee: Illinois Tool Works Inc., Glenview, IL (US)

( * ) Notice: Subject to any disclaimer, the term of this patent is extended or adjusted under 35 U.S.C. 154(b) by 105 days.

(21) Appl. No.: 16/377,472

(22) Filed: Apr. 8, 2019

(65) Prior Publication Data
US 2019/0323530 A1    Oct. 24, 2019

Related U.S. Application Data

(66) Substitute for application No. 62/699,514, filed on Jul. 17, 2018.

(60) Provisional application No. 62/659,736, filed on Apr. 19, 2018.

(51) Int. Cl.
*F16B 5/06*    (2006.01)
*F16B 21/07*    (2006.01)

(52) U.S. Cl.
CPC ............ *F16B 5/065* (2013.01); *F16B 5/0657* (2013.01); *F16B 21/075* (2013.01)

(58) Field of Classification Search
CPC ....... F16B 21/075; F16B 5/065; F16B 5/0657
See application file for complete search history.

(56) References Cited

U.S. PATENT DOCUMENTS

| | | | |
|---|---|---|---|
| 6,796,006 B2 | 9/2004 | Hansen | |
| 8,920,089 B1* | 12/2014 | Stewart | F16B 5/0258 411/352 |
| 2002/0017009 A1 | 2/2002 | Smith et al. | |
| 2004/0049894 A1 | 3/2004 | Jackson, Jr. et al. | |
| 2004/0151560 A1* | 8/2004 | Kirchen | F16B 19/008 411/508 |
| 2008/0052878 A1* | 3/2008 | Lewis | F16B 19/004 24/297 |
| 2012/0311829 A1 | 12/2012 | Dickinson et al. | |
| 2014/0050548 A1* | 2/2014 | Loewe | F16B 5/0607 411/48 |
| 2015/0128386 A1* | 5/2015 | Lepper | F16B 5/0657 24/458 |
| 2015/0321622 A1 | 11/2015 | Dickinson et al. | |

(Continued)

FOREIGN PATENT DOCUMENTS

| | | |
|---|---|---|
| CA | 2443537 A1 | 3/2004 |
| CN | 205533647 U | 8/2016 |

(Continued)

OTHER PUBLICATIONS

Search Report, related EP Application No. 19169557.6, dated Sep. 17, 2019, 7 pages.

*Primary Examiner* — David M Upchurch
(74) *Attorney, Agent, or Firm* — Quarles & Brady LLP

(57) ABSTRACT

A fastener assembly is configured to be securely coupled with one or more components. The fastener assembly includes a body including a flange, and a gasket that is secured to the flange. The body is configured to securely couple to a clip. The body includes one or more features that are configured to cooperate with one or more reciprocal features of the clip to increase retention strength.

16 Claims, 20 Drawing Sheets

(56) References Cited

U.S. PATENT DOCUMENTS

2015/0322985 A1* 11/2015 Scroggie ............... F16B 5/0084
                                                          29/428
2016/0375840 A1   12/2016  Dickinson et al.
2018/0119715 A1*  5/2018  Sakurai ................. F16B 5/0258
2019/0170178 A1   6/2019  Leverger et al.

FOREIGN PATENT DOCUMENTS

| | | | |
|---|---|---|---|
| CN | 106164501 | A | 11/2016 |
| DE | 102010011874 | A1 | 9/2011 |
| EP | 1403534 | A1 | 3/2004 |
| EP | 1895171 | A2 | 3/2008 |

* cited by examiner

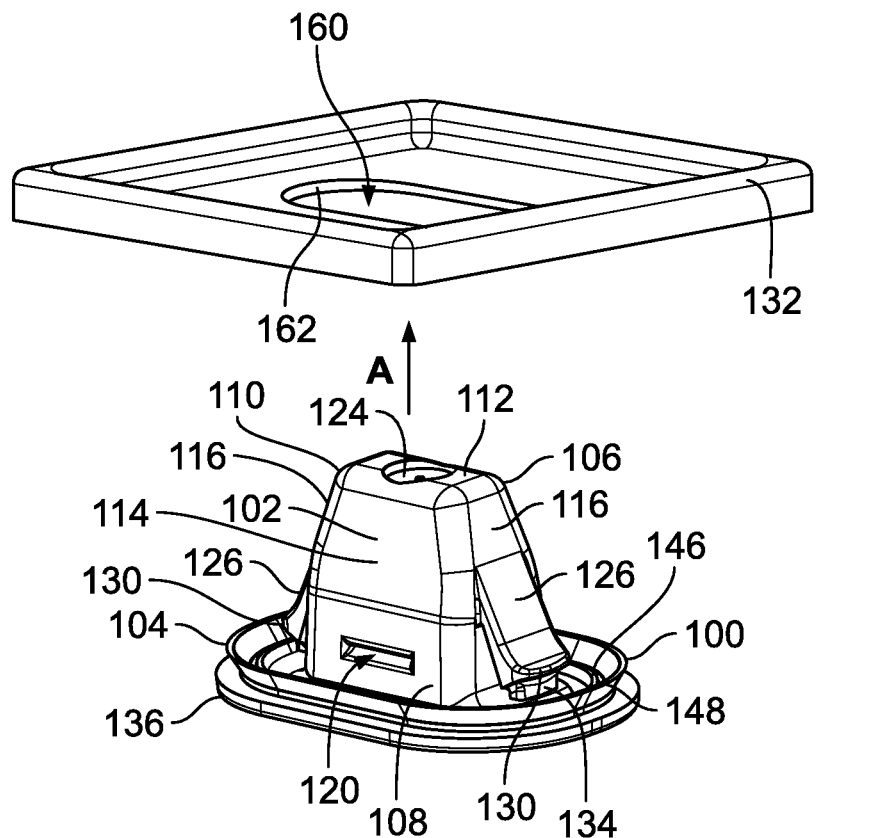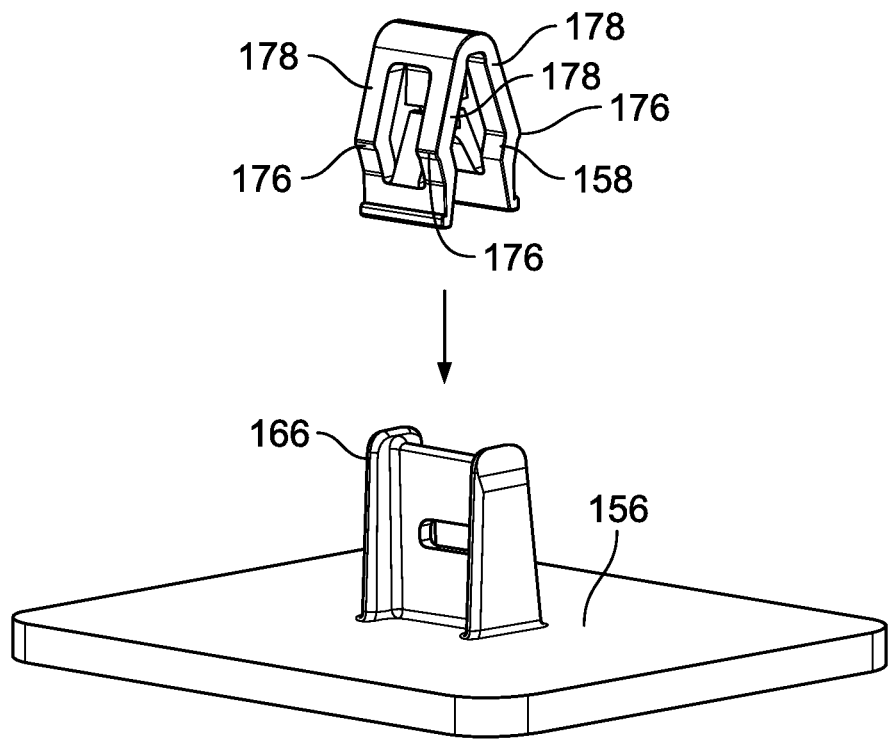
FIG. 8

SEALED COUPLING FASTENER ASSEMBLIES

RELATED APPLICATION

The present application claims the benefit of U.S. Provisional Application No. 62/659,736, filed on Apr. 19, 2018, and U.S. Provisional Application No. 62/699,514, filed on Jul. 17, 2018, both of which are incorporated herein by reference in their entirety.

FIELD OF EMBODIMENTS OF THE DISCLOSURE

Embodiments of the present disclosure generally relate to fastener assemblies that are configured to connect components together, and more particularly, fastener assemblies that are configured to couple to clips.

BACKGROUND

Various components are secured together by fasteners. For example, panels, sheets, frames, and the like may be secured together through fastener assemblies that include a male fastening member that securely mates with a female fastening member.

A fastener assembly may be used to secure a first component, such as a metal sheet or panel, to a second component, such as trim molding. More specifically, a female fastening member of a fastener assembly may be urged into a slot of a panel, for example. A male fastening member can therefore be connected to a trim molding, for example, and lock into the female fastening member, which creates a fastened structure. These types of fastener assemblies that can be received within a slot of a panel may be used with respect to various components of vehicles, such as belt line molding, bumper step pads, rocker molding, storage compartments, door armrests, seatback attachments, instrument panels, and the like.

However, it has been found that moisture can permeate between secured components through known fastener assemblies. For example, water may pass into one or both of the male and female components through various channels, gaps, and the like of the fastener assemblies. This moisture can lead to leakage and degrade the fastener assembly and panels. Additionally, certain known fastener assemblies may require a relatively high amount of force to install, which may reduce the retention force of those fastener assemblies.

Still further, when making a blind connection between a first panel and a second panel, it can be difficult to align the edges of the fastener. This can lead to difficulty during assembly and wasted time. In addition, fasteners known in the art can have performance issues after repeated assembly, which can cause fasteners to be used once and then discarded.

In light of the above deficiencies, it would be desirable to provide a fastener assembly to overcome these shortcomings.

SUMMARY OF EMBODIMENTS OF THE DISCLOSURE

Embodiments of the present disclosure provide a fastener assembly that is configured to securely couple to one or more components. The fastener assembly includes a body including a flange, and a gasket that secures to the flange. The body is configured to securely couple to a clip. The body includes one or more features that are configured to cooperate with one or more reciprocal features of the clip to increase retention strength.

In some embodiments, a fastener assembly that is configured to securely couple to one or more components includes a body defining an interior volume, a flange extending from a lower end of the body and including a plurality of apertures, and a gasket secured to the flange. The body is configured to securely couple to a clip, and the body includes one or more features that are configured to cooperate with one or more reciprocal features of the clip to increase retention strength.

In other embodiments, a fastener assembly includes a body defining an interior volume, a gasket including a sealing rim that secures to a flange and securely seals to a component, and at least two engagement features disposed on inner walls of the body to cooperate with one or more reciprocal features of a different component. The flange extends from a lower end of the body and includes a plurality of apertures. The body comprises one or more retaining arms to securely fasten to the component, and is configured to receive the different component.

In yet other embodiments, a method of fastening a fastener assembly includes the steps of providing a first component configured to receive the fastener assembly, providing a second component configured to align with an internal volume of the fastener assembly, and inserting the fastener assembly through the first component. Retaining arms of the fastener assembly secure the first component to the fastener assembly. Additional steps include inserting the second component into the internal volume of the fastener assembly, wherein engagement features of the internal volume couple to reciprocal features of the second component, and removing the second component from the fastener assembly. The second component is capable of being inserted and removed multiple times from the fastener assembly.

BRIEF DESCRIPTION OF SEVERAL VIEWS OF THE DRAWINGS

FIG. 8 is an isometric exploded view of the fastener assembly of FIG. 1 aligned with a first component and a second component;

Figure 1:
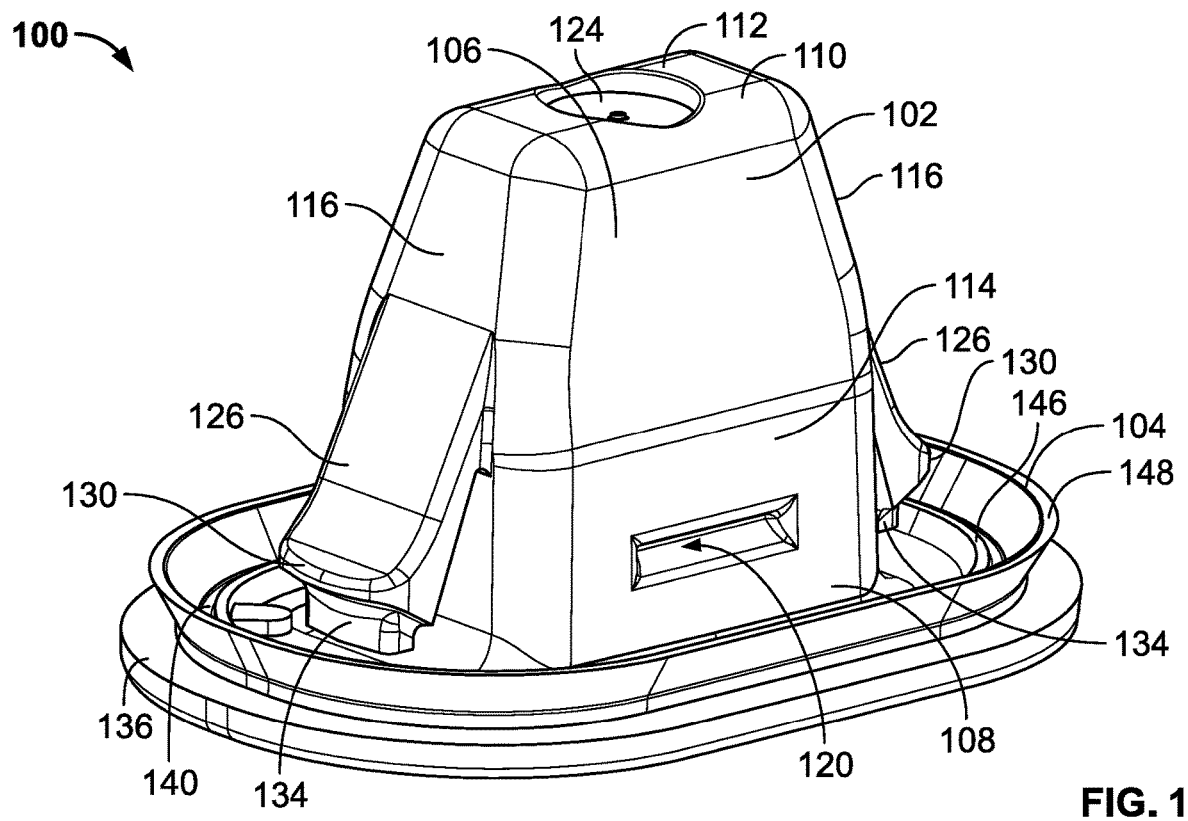
FIG. 1 is an isometric view of a fastener assembly, according to a first embodiment of the present disclosure.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE DISCLOSURE

Embodiments of the present disclosure provide a fastener assembly that is configured to secure a first component, such as a first panel, to a second component, such as a second panel. For example, the first component may be a metal body panel in a vehicle, while the second component may be an inner trim component. One exemplary implementation of this is fastener assembly 100 shown in FIGS. 1-14, provides a number of advantages over prior art solutions.

Referring now to FIG. 1, the fastener assembly 100 includes a body 102 and a gasket 104 that sealingly couples to the body 102. The body 102 has an upper end 106 and a lower end 108. The body 102 is generally in the form of a trapezoidal prism having rounded edges, but may comprise alternative geometric shapes that allow the body 102 to securely fasten two components together. The upper end 106 of the body 102 has rounded edges 110, which provide for ease of installation of the fastener assembly 100 when the fastener assembly 100 is inserted into an aperture of a material. The rounded edges 110 connect with a top side 112 of the body 102. Further, the body 102 has opposing side walls 114 and opposing lateral walls 116 which, in combination, define an interior volume or chamber 118 therebetween (see FIG. 5). A depression 120 is positioned within each of the side walls 114, and extends into the chamber 118 to create an engagement feature 122 (see FIG. 5), which is discussed in greater detail hereinafter below. A circular depression 124 is also disposed within the top side 112 of the body 102.

Still referring to FIG. 1, lateral retaining arms 126 extend outwardly from each lateral wall 116 to secure the fastener assembly 100 in place. The lateral arms 126 project from the lateral wall 116 at an acute angle relative to the lateral wall 116. A void 128 (see FIG. 4) is created between the lateral retaining arm 126 and the lateral wall 116 when the retaining arms 126 are in an extended configuration, such that the lateral retaining arms 126 can flex in or out, which facilitates assembly and removal. Each of the lateral retaining arms 126 comprises a tip 130 at an end of the arm 126. The tips 130 are used to securely lock a first component 132 (see FIG. 13) in place during assembly. Fingers 134 extend from the tips 130 of the lateral retaining arms 126 to further aid in holding the first component 132 centered relative to the fastener assembly 100. The lateral retaining arms 126 can take the shape of a wing positioned on the lateral walls 116. However, this configuration is not limiting and the lateral retaining arms 126 can take any shape in order to help secure the first component 132 to the fastener assembly 100.

Figure 2:
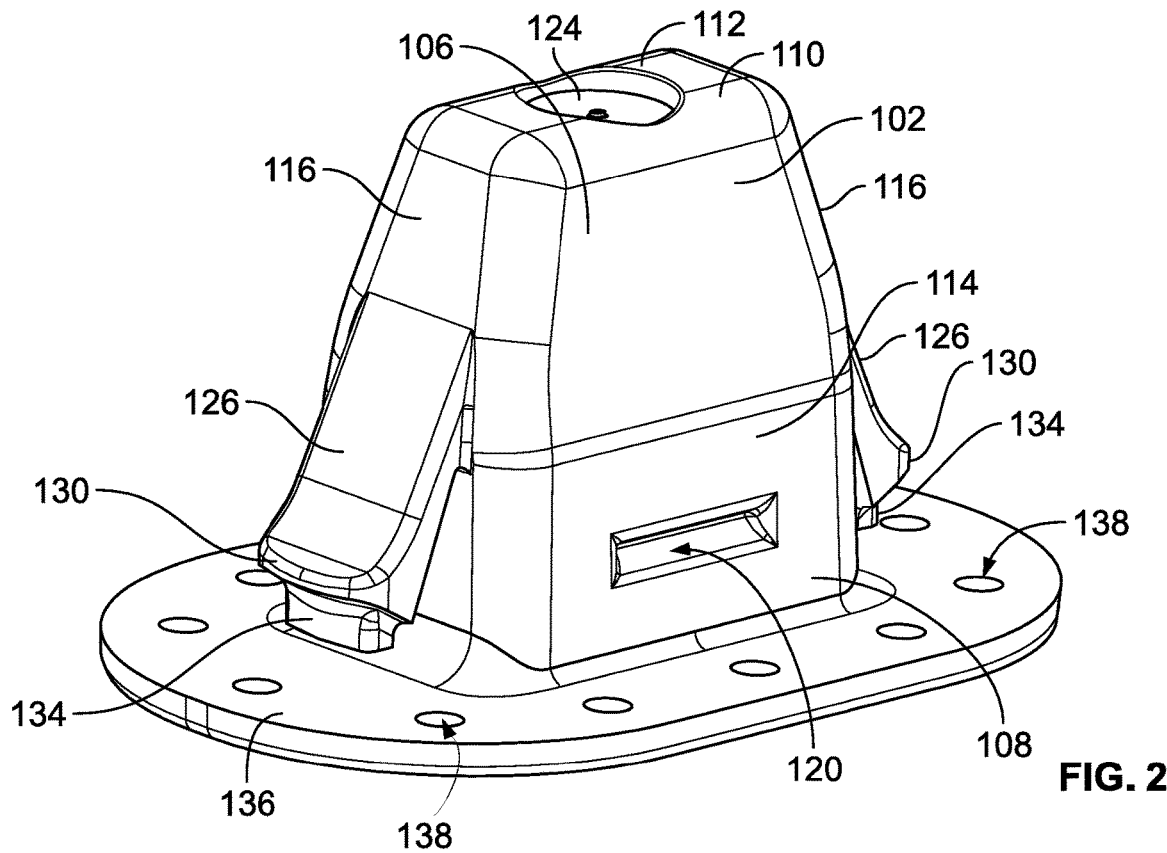
FIG. 2 is an isometric view of a body of the fastener assembly of FIG. 1.

Referring to FIGS. 1 and 2, a flange 136 extends peripherally about the lower end 108 of the body 102, and includes a plurality of apertures 138 that are positioned along the flange 136, which aid in securement of the gasket 104 to the flange 136. The gasket 104 is disposed on the flange 136 and is generally racetrack shaped, but may comprise alternative geometric shapes that may be regular, e.g., oval or rectangular, or irregular. The gasket 104 may include a sealing rim 140 (see FIG. 3) that extends around the lower end 108 of the body 102. Further, the gasket 104 may comprise one or more protuberances 142 (such as studs, posts, barbs, nubs, and/or the like) extending from a bottom 144 of the sealing rim 140. The gasket 104 is positioned over the flange 136, such that the protuberances 142 are securely retained within the apertures 138. This configuration locks the gasket 104 to the flange 136 of the body 102.

Figure 3:
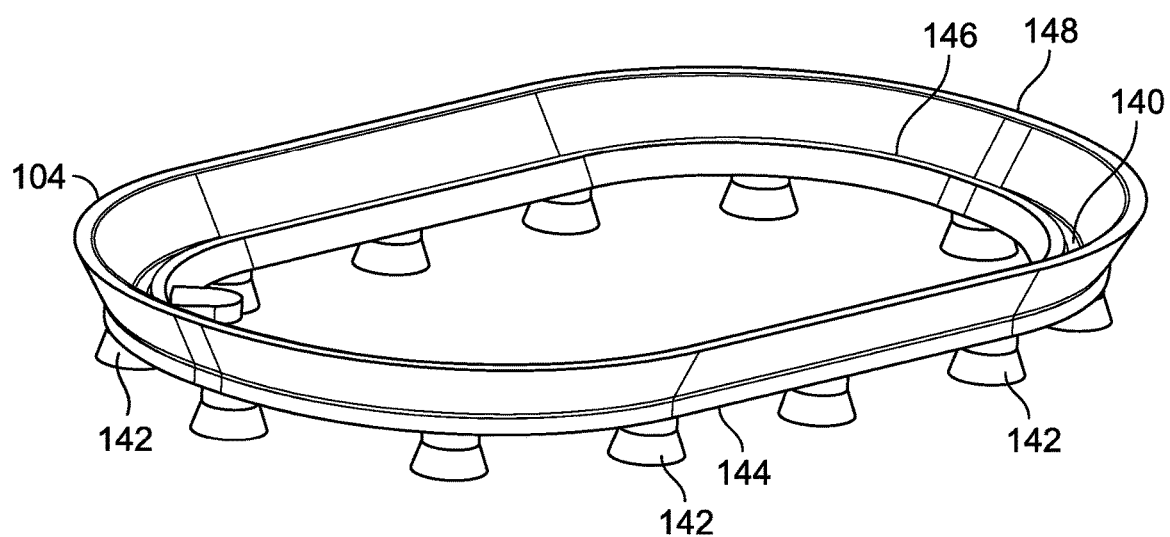
FIG. 3 is an isometric view of a gasket of the fastener assembly FIG. 1.
Figure 4:
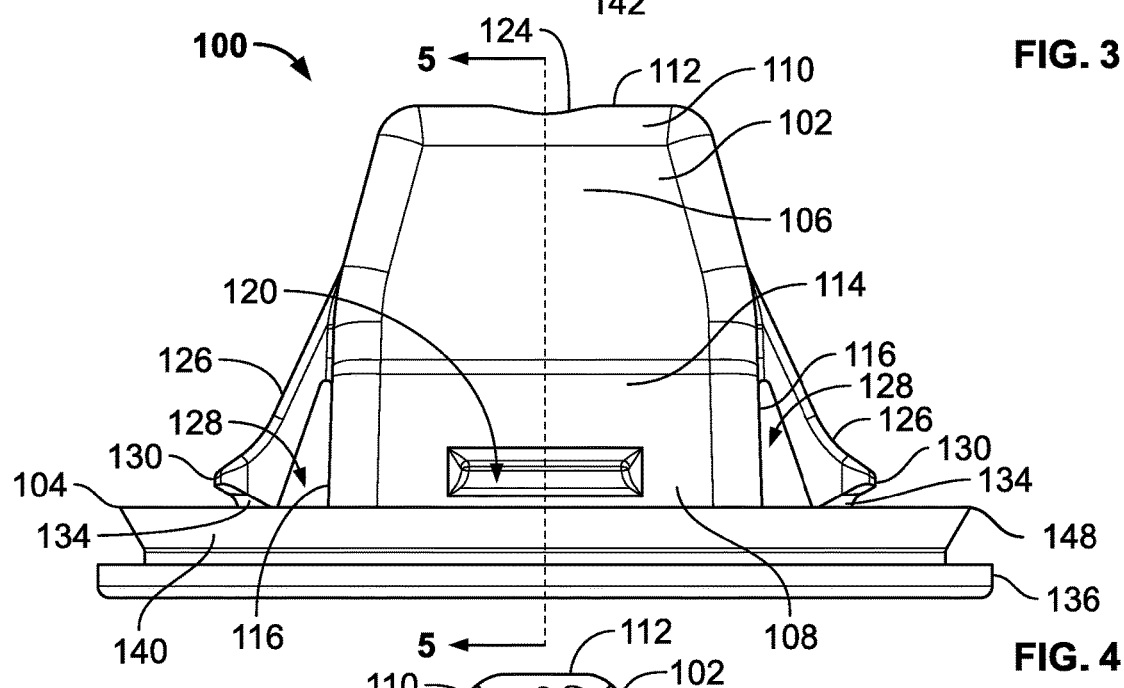
FIG. 4 is a front elevation view of the fastener assembly of FIG. 1.
Figure 5:
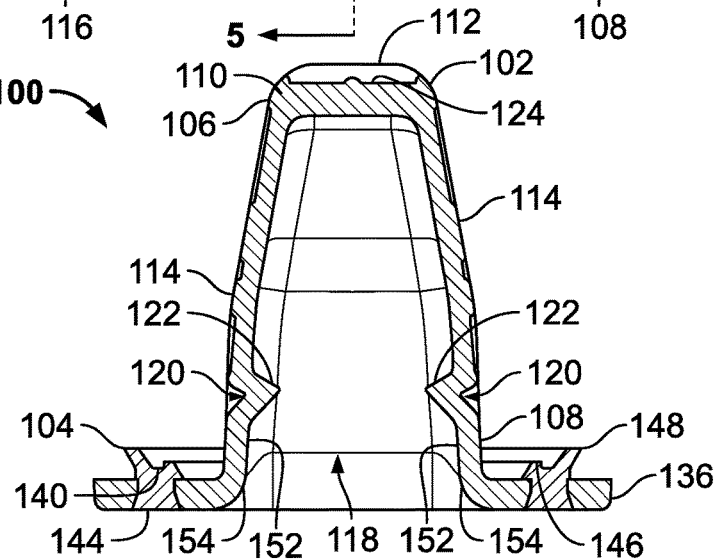
FIG. 5 is a cross-sectional view of the fastener assembly taken through line 5-5 of FIG. 4.
Figure 6:
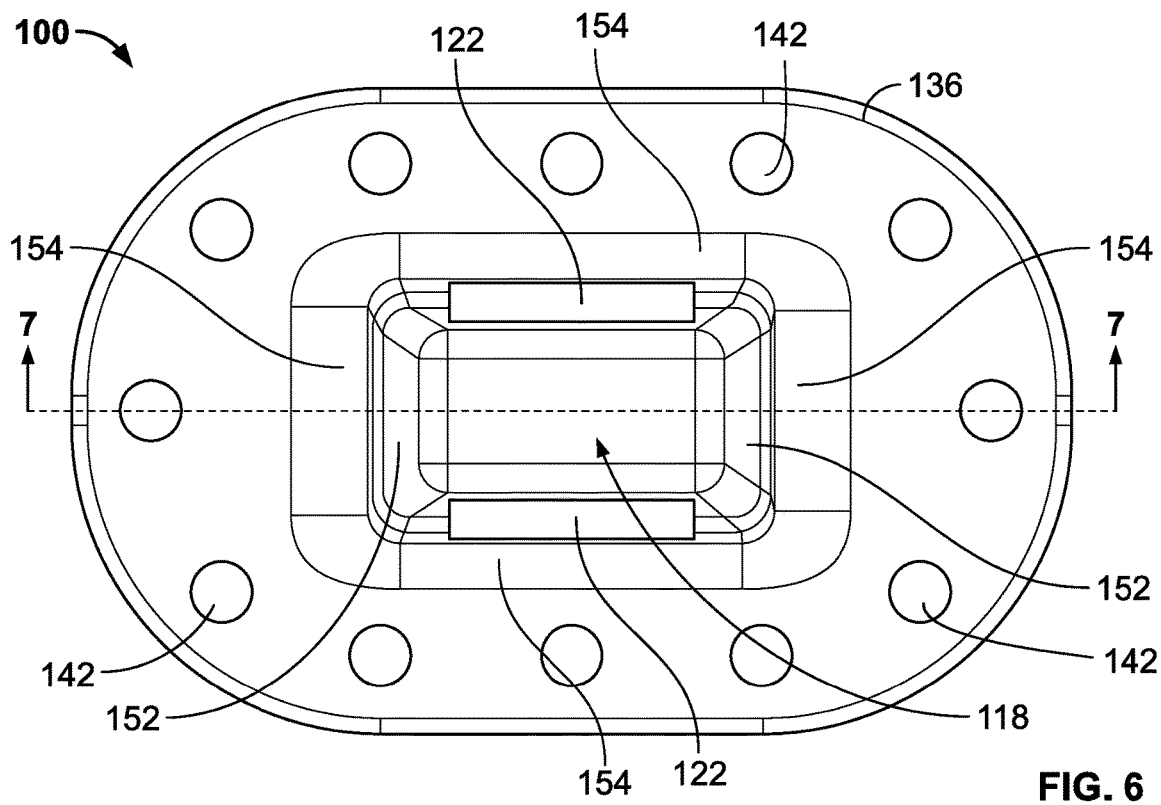
FIG. 6 is a bottom view of the fastener assembly of FIG. 1.
Figure 7:
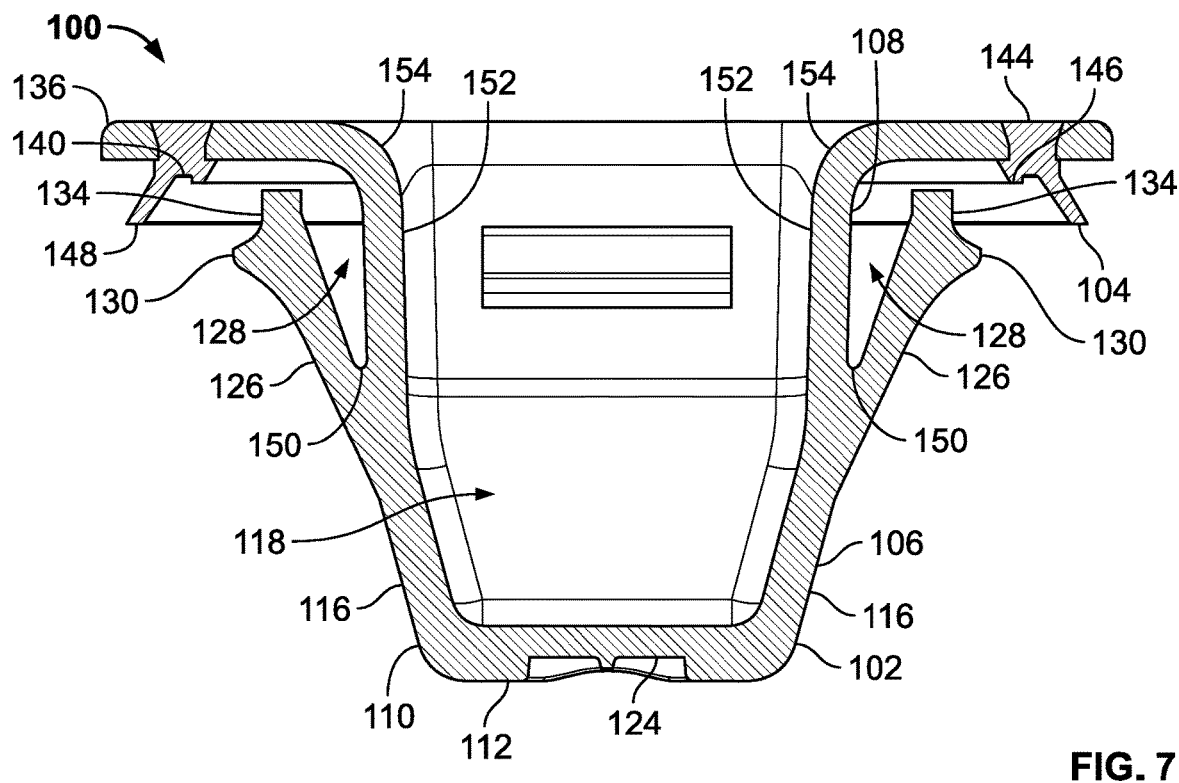
FIG. 7 is a cross-sectional view of the fastener assembly through line 7-7 of FIG. 6.

Referring still to FIG. 3, the gasket 104 may include an inner leg 146 and an outer leg 148 extending upwardly from the sealing rim 140 relative to the flange 136. The legs 146, 148 are connected at the base of the sealing rim 140 and extend upward and outwardly with respect to the flange 136. The outer leg 148 is positioned higher than or above the inner leg 146; however, the legs 146, 148 can include any height configuration such that the fastener assembly 100 is securely sealed to block water ingress.

With reference to FIGS. 4-7, the void 128 extends under the lateral retaining arms 126 and is included to control various insertion forces and stresses. In order to reduce or eliminate cracking, a spherical pass-through 150 (see FIG. 7) is positioned underneath the point of intersection between the lateral retaining arms 126 and the body 102 of the fastener assembly 100. The spherical pass-through 150 distributes the force and eliminates stress points during installation. The size of the spherical pass-through 150 can vary in order to control the force necessary for installation.

With reference still to FIGS. 4-7, the chamber 118 is disposed inside of the body 102 and allows for the insertion of another component to fasten the assembly together. The chamber 118 comprises four inner walls 152 that comprise large lead-in features 154 that are curved to allow for ease of installation. The lead-in features 154 are curved to make it easier to assemble when making a blind connection. Further, the engagement features 122 extend inwardly from the inner walls 152 opposite the corresponding depressions 120 that are superimposed on the side walls 114 of the body 102. In an alternative embodiment, there can be more than one engagement feature 122 and depression 120 on each side wall 114.

The body 102 may be formed of a rigid material, such as a hard plastic, and the gasket 104 may be formed of a softer material, such as rubber or another elastomeric material. In at least one embodiment, the body 102 may first be integrally formed and molded, such as through an injection molding process. The gasket 104 may then be overmolded directly onto the body 102. However, in other embodiments, the gasket 104 may be molded separately and attached to the body 102 in a separate step.

With reference to FIG. 8, the fastener assembly 100 is shown aligned with the first component 132 (such as a metal plate), a second component 156 (such as trim molding), and a clip 158. The first component 132 is configured to receive the fastener assembly 100 through a slot 160. In the present embodiment, the slot 160 is generally oval, but may comprise alternative geometric shapes that may be regular, e.g., rectangular, or irregular, such that the fastener assembly 100 can securely fit through the slot 160. The slot 160 includes internal edges 162 that define the slot 160.

Figure 13:
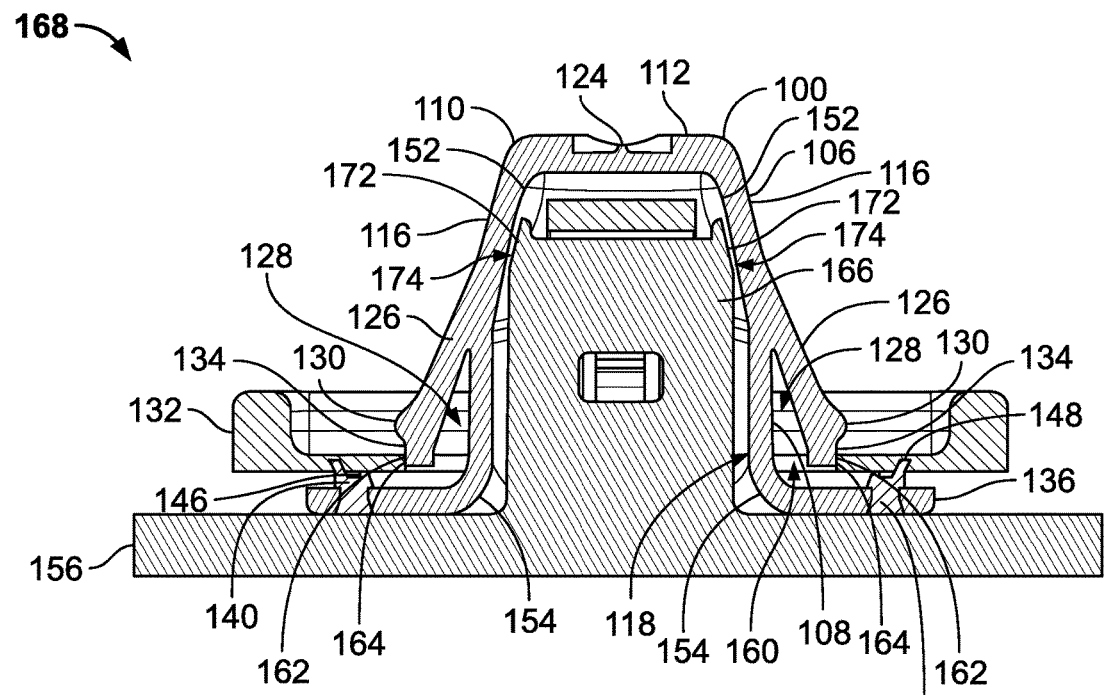
FIG. 13 is a cross-sectional view of the fastening system through line 13-13 of FIG. 10.

Still referring to FIG. 8, in order to secure the first component 132 with the fastener assembly 100, the slot 160 is aligned with the upper end 106 of the body 102. The fastener assembly 100 is then urged onto the first component 132 in the direction of arrow A, so that the rounded edges 110 of the body 102 interact with internal edges 162 of the first component 132. Upon urging of the fastener assembly 100, the rounded edges 110 guide the fastener assembly 100 into a centered position with respect to the first component 132 by aligning with the internal edges 162 of the slot 160. The internal edges 162 of the slot 160 slide over the lateral retaining arms 126, which causes the arms 126 to rotate inwardly. As the internal edges 162 of the slot 160 ride over the tips 130 of the lateral retaining arms 126, the lateral retaining arms 126 flex back to an at-rest or expanded configuration, and hook the first component 132 to the fastener assembly 100. As such, the internal edges 162 that define the slot 160 are trapped between the tips 130 of the lateral retaining arms 126 and the gasket 104, thereby securing the first component 132 to the fastener assembly 100 (see FIG. 13). Referring specifically to FIG. 13, the finger 134 includes a contact point 164 that may engage the internal edges 162 of the slot 160. The contact point 164 and the finger 134 help locate and center the fastener assembly 100 within the slot 160.

Figure 9:
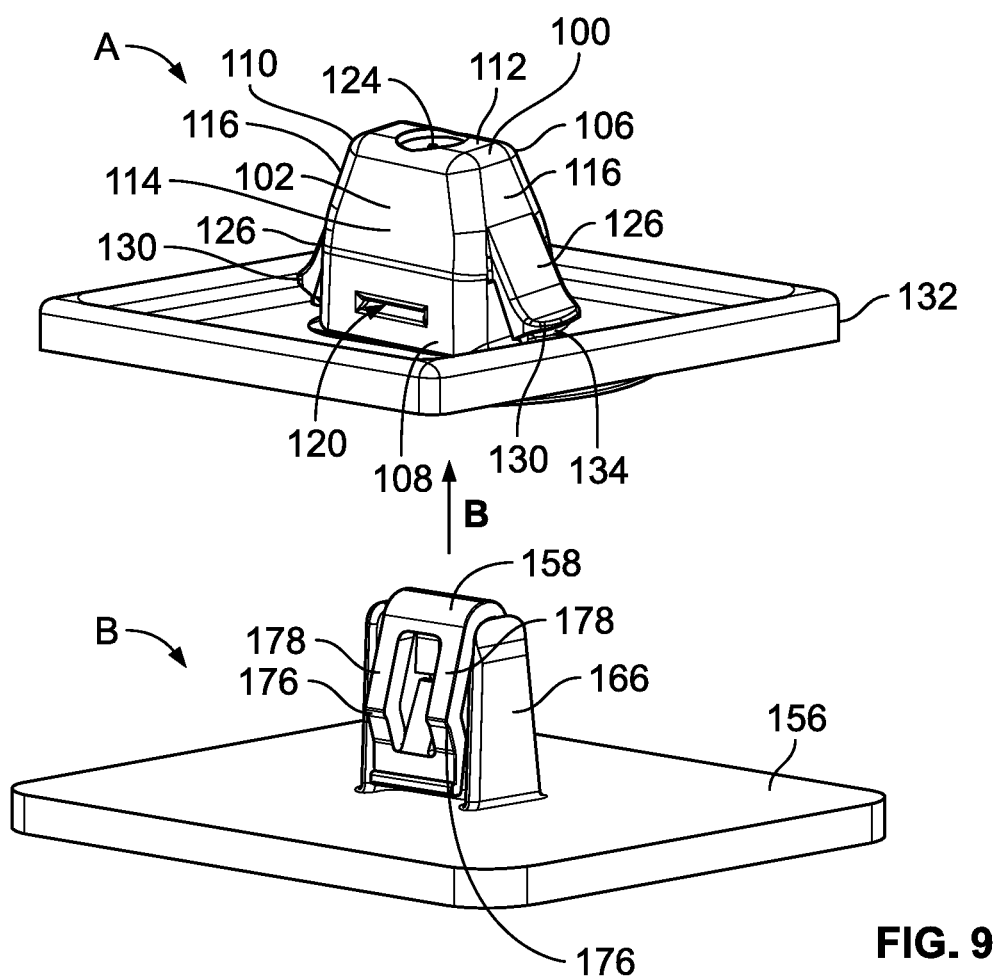
FIG. 9 is an isometric view of a fastening system comprising the fastener assembly of FIG. 8 secured to the first component and a clip secured to the second component.

Once configured together, the fastener assembly 100 and the first component 132 make up a subassembly A (see FIG. 9). In such a configuration, the fastener assembly 100 is locked in place with the first component 132 such that removal would require a significant force. The first component 132 is sealed to the gasket 104 to provide a sealed, liquid-tight construction. Moreover, the lateral retaining arms 126 provide an audible click when the fastener assembly 100 is secured to the first component 132, thereby providing positive feedback to an installer.

Referring again to FIG. 8, the clip 158 is snapped onto a rib tower 166 of the second component 156. Once configured together, the clip 158 and the second component 156 make up a subassembly B (see FIG. 9). Further details relating to the configuration and components of subassembly B are disclosed in U.S. Pat. No. 6,796,006, which is incorporated herein by reference in its entirety.

Referring to FIG. 9, subassembly A is shown, which includes the fastener assembly 100 connected to the first component 132. In addition, subassembly B is depicted with the clip 158 being attached to the second component 156. In order to secure the two subassemblies together, the clip 158 is aligned with the chamber 118 (see FIG. 5) of the fastener assembly 100. The clip 158 and the rib tower 166 are urged in the direction of arrow B into the chamber 118 so that the features can mate together. Upon urging of the subassembly B, the large lead-in features 154 guide the clip 158 and rib tower 166 into a centered position with respect to the fastener assembly 100 by abutting against the inner walls 152 that define the chamber 118 (see FIG. 5). With continued urging of the subassembly B, the clip 158 and rib tower 166 snap into place with the fastener assembly 100.

Still referring to FIG. 9, the fastener assembly 100 can be quickly and reliably secured to the first component 132 and the second component 156. The large lead-in features 154 (see FIG. 5) of the body 102 allow for ease of installation no matter the view or position of the installer. Further, the fastener assembly 100 is able to be repeatedly serviced and used.

Figure 10:
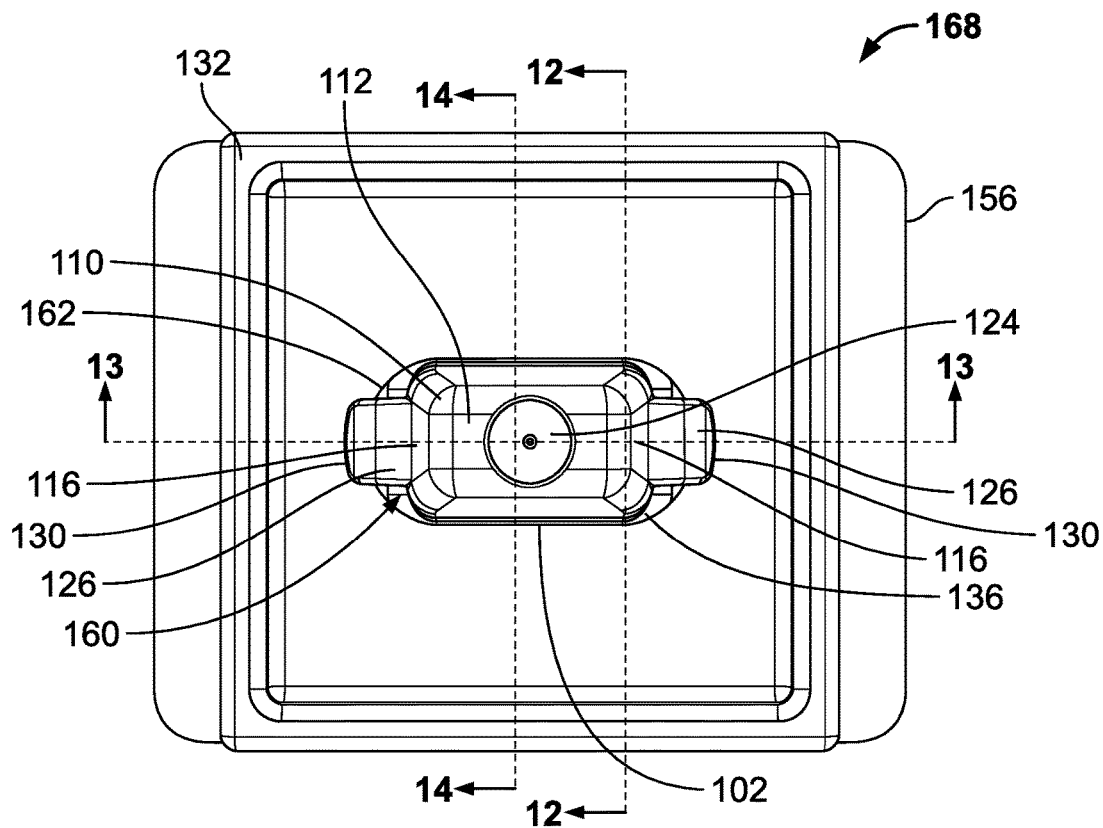
FIG. 10 is a top view of the fastening system of FIG. 9 in an assembled configuration.
Figure 11:
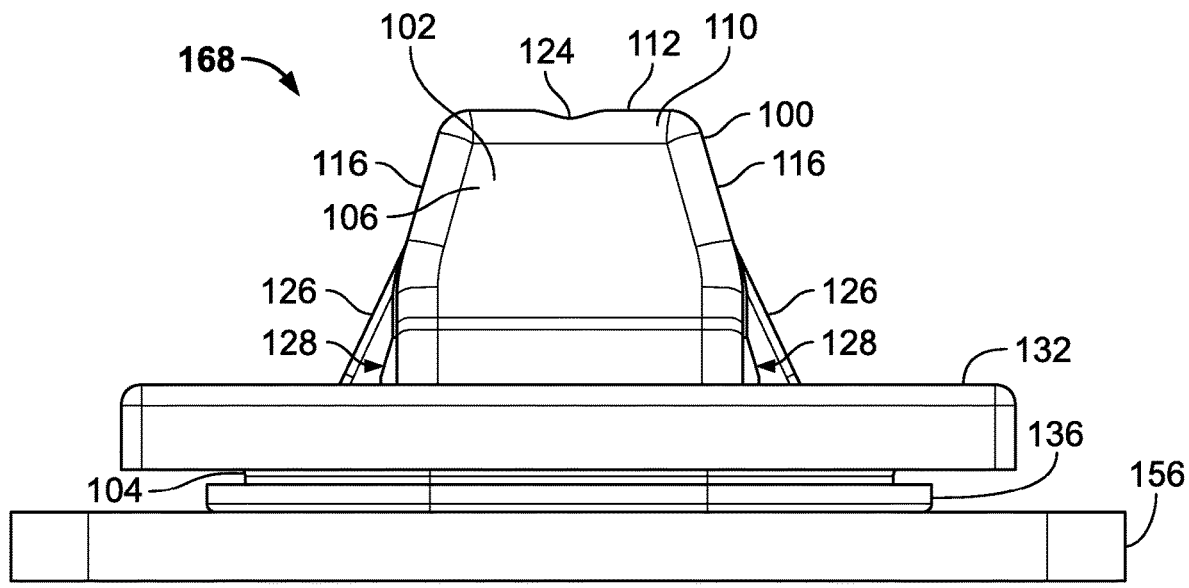
FIG. 11 is a front view of the fastening system of FIG. 10.

Referring now to FIGS. 10 and 11, a fastening system 168 is provided, which depicts subassembly A and subassembly B connected together. The first component 132 and second component 156 are connected to the fastener assembly 100 in a way that seals the components 132, 156, thereby preventing or substantially preventing liquid from passing from one side to the other. In some embodiments, the seal is a hermetic seal.

Figure 12:
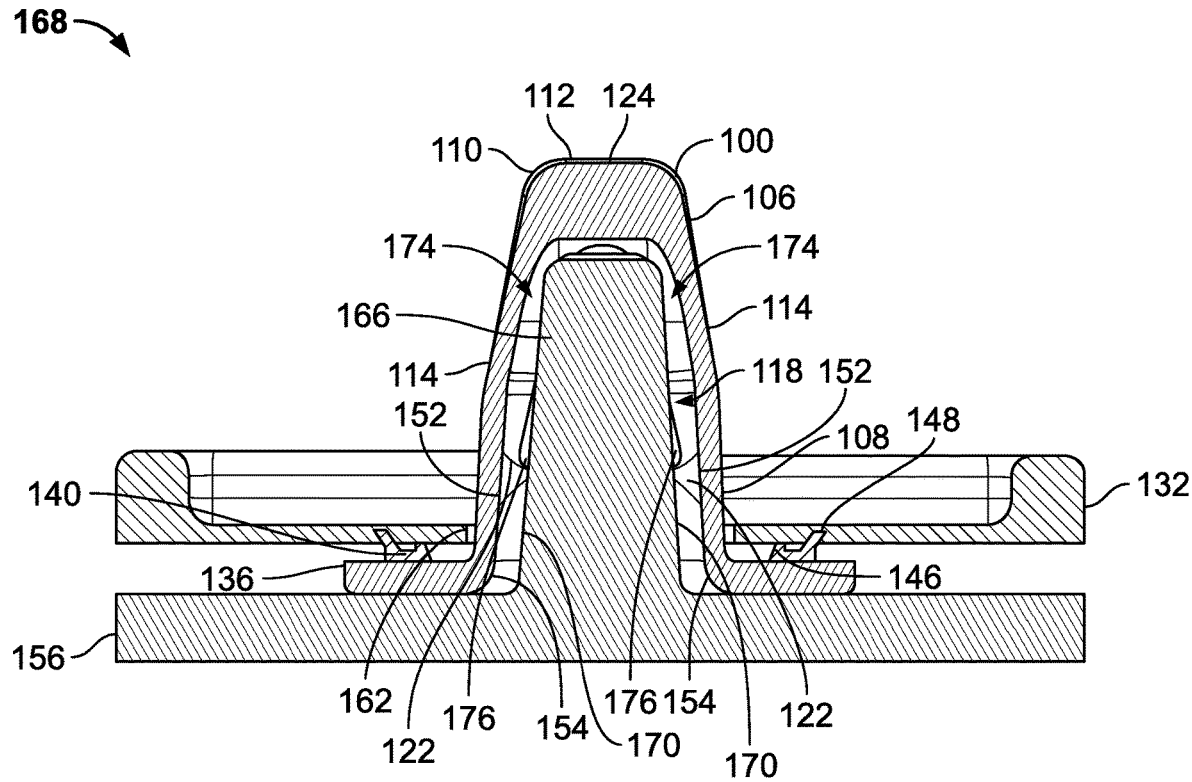
FIG. 12 is a cross-sectional view of the fastening system through line 12-12 of FIG. 10.

With reference to FIGS. 12 and 13, parallel wall features 170 are shown, which are disposed on the rib tower 166. The parallel wall features 170 align with the inner walls 152 of the fastener assembly 100 to control movement of the fastener assembly 100. In a similar fashion, parallel wall features 172 on rib tower 166 interact with the inner walls 152 of the fastener assembly 100 to control movement in the opposite direction as shown in FIG. 13. As a result, the rib tower 166 and clip 158 are securely positioned inside of the fastener assembly 100 to completely fasten the two components together. The parallel wall features 170, 172 may contact the inner walls 152 of the fastener assembly 100. In addition, a gap 174 may exist between the parallel wall features 170, 172 and the inner walls 152. The gap 174 can be adjusted to provide specific movement requirements for certain components or vehicles.

Figure 14:
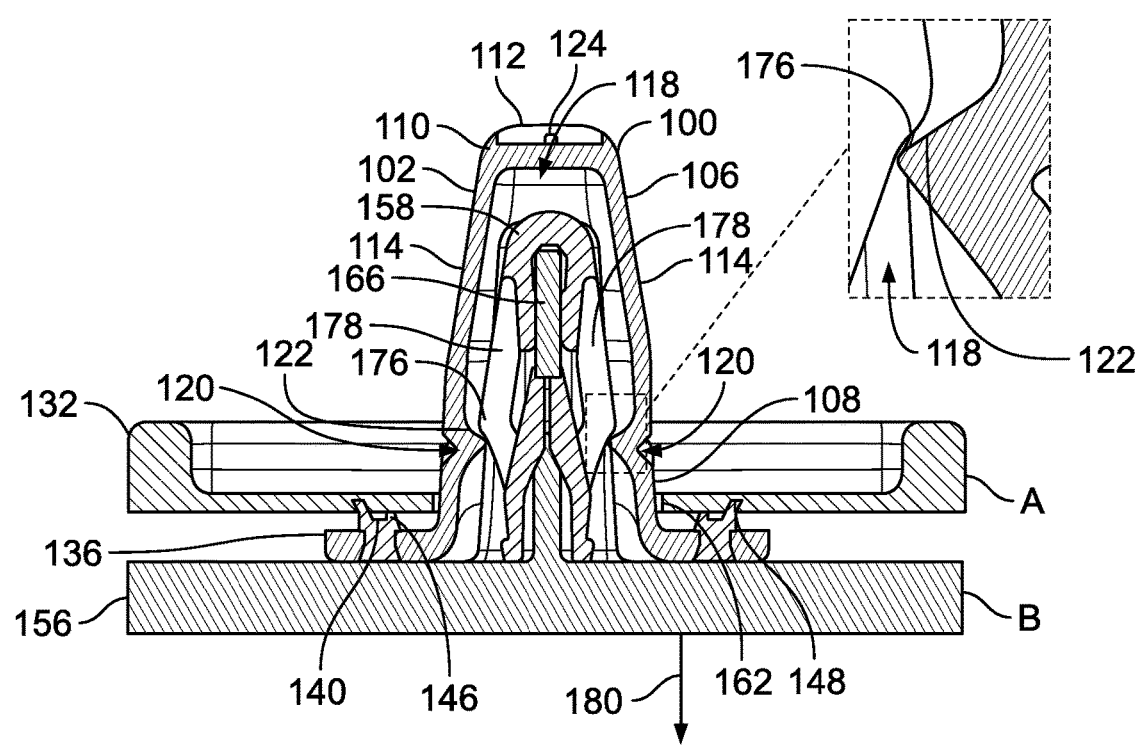
FIG. 14 is a cross-sectional view of the fastening system through line 14-14 of FIG. 10.

With reference to FIG. 14, the connection between the clip 158 and the fastener assembly 100 is shown. As discussed above, the engagement features 122 extend into the chamber 118 from the inner walls 152. The engagement features 122 can extend inwardly at any angle as long as such disposition of the engagement features 122 can successfully secure to the clip 158. Each of the engagement features 122 engages with a reciprocal feature or knee 176 of the clip 158. The knees 176 are situated on legs 178 of the clip 158. The clip 158 can include a plurality of knees 176. During installation, the knees 176 are urged over the engagement features 122 to hook the engagement features 122 underneath the knees 176. Once installed, the engagement features 122 are trapped below the knees 176 to maximize retention between the fastener assembly 100 and the clip 158. This configuration allows for the fastener assembly 100 to securely hold the first component 132 and second component 156 together.

Once installed, subassembly B can be removed from the fastening system 168 by applying a force to subassembly B in the direction of arrow 180. The applied force must be great enough to pull the knees 176 over the engagement features 122. The fastener assembly 100 is designed to be repeatedly used without compromising the retention strength. The engagement features 122 can engage and disengage the clip 158 a number of times before wear is noticed. In one example, the subassembly B can be inserted and removed five times or more without compromising the retention force. As a result, the subassembly B can be removed or fixed multiple times while using the same fastener assembly 100.

Figure 15:
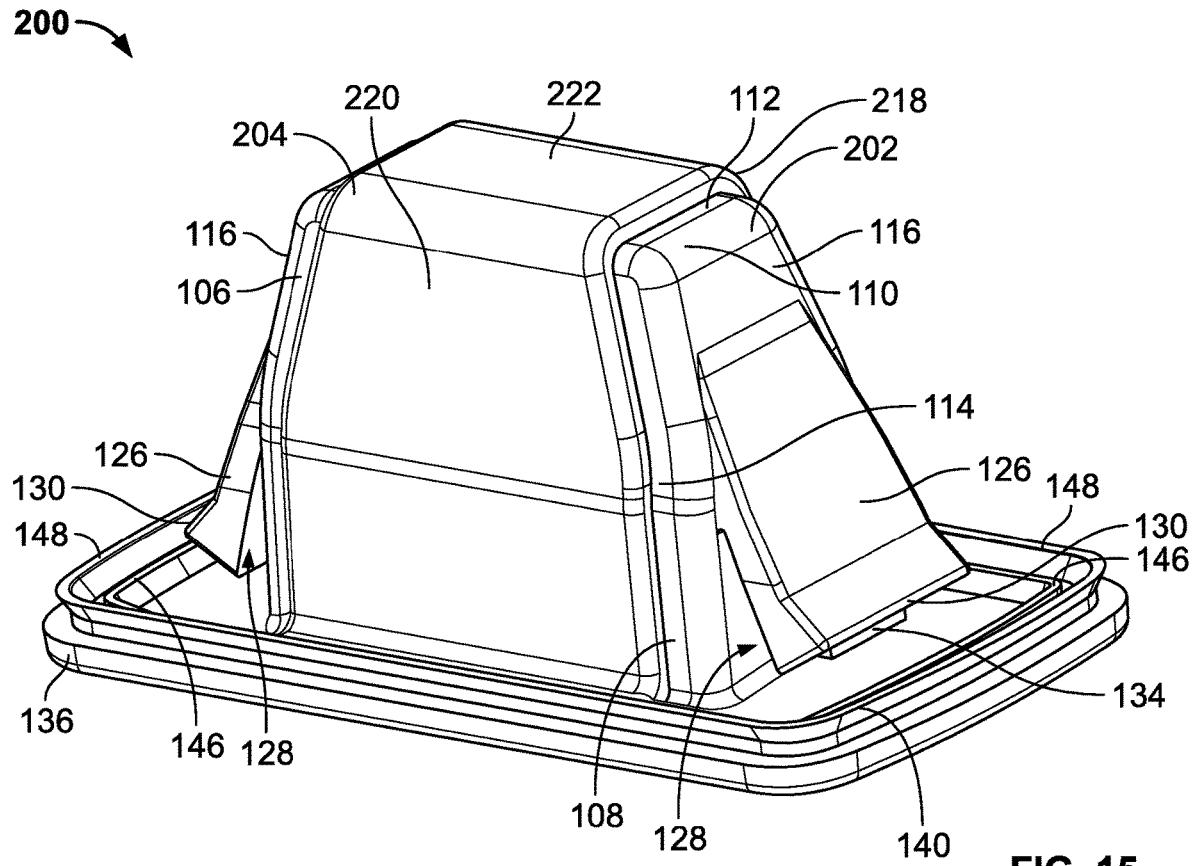
FIG. 15 is an isometric view of another fastener assembly, according to another embodiment of the present disclosure.

Referring now to FIG. 15, like reference numbers are used with regard to an alternative embodiment of a fastener assembly 200. The fastener assembly 200 includes a body 202 and a gasket 204 that sealingly couples to the body 202. The body 202 may be formed of a rigid material, such as a hard plastic, and the gasket 204 may be formed of a softer material, such as rubber or another elastomeric material. In some embodiments, the body 202 may be integrally formed and molded, e.g., through an injection molding process. The gasket 204 may be overmolded directly onto the body 202. However, in other embodiments, the gasket 304 may be molded separately and attached to the body 202 in a separate step.

Figure 16:
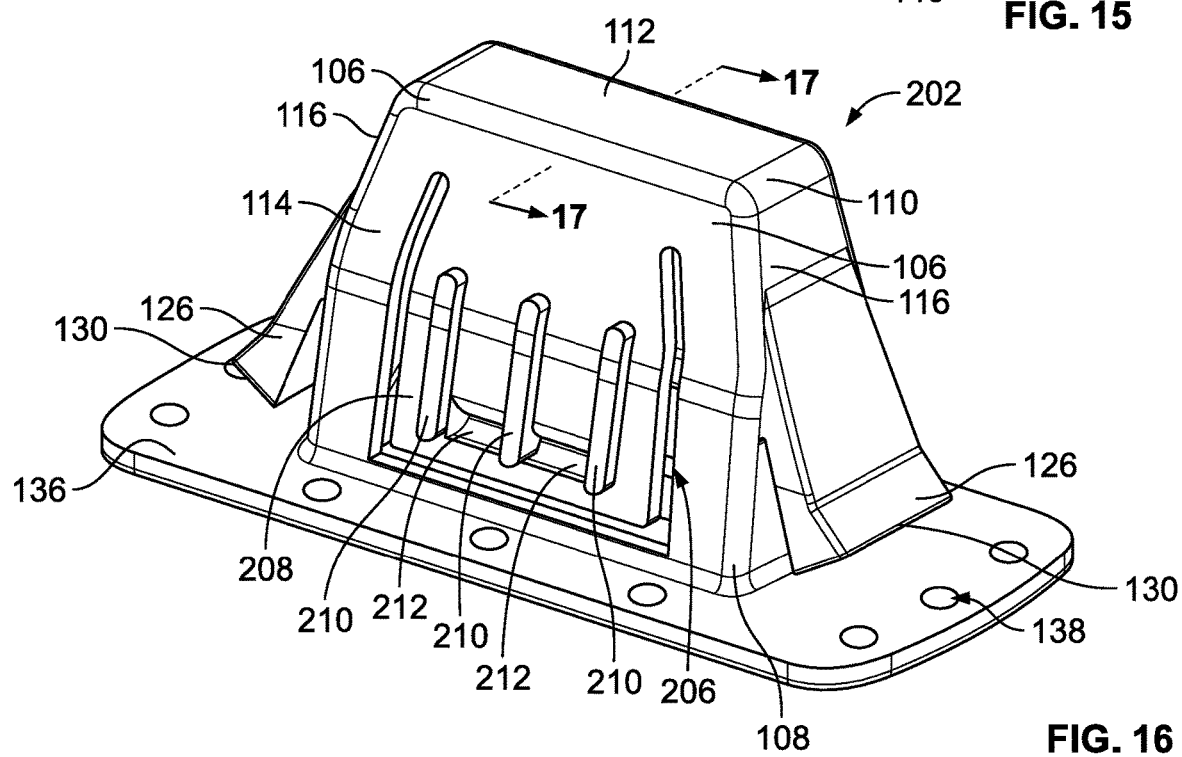
FIG. 16 is an isometric view of a body of the fastener assembly of FIG. 15.

With reference to FIG. 16, the body 202 is shown detached from the gasket 204. The body 202 includes cut out portions 206 that are positioned on the side walls 114 and create a hanging feature 208 that extends from the upper end 106. This configuration allows for easier manufacturing and installation of the fastener assembly 200. The cut out portions 206 partially enclose the hanging feature 208 to allow for movement of the hanging feature 208. The hanging feature 208 is positioned on both side walls 114 and includes a plurality of extrusions 210 that extend outwardly from the body 202 to help with the manufacturing process of the fastener assembly 200. The extrusions 210 have an elliptic cylinder shape, however, the shape as disclosed herein is not limiting and the extrusions 210 can take any shape in order to securely mate with the gasket 204. Additionally, the extrusions 210 allow for lower insertion forces and easier alignment during final installation by an end user.

Figure 17:
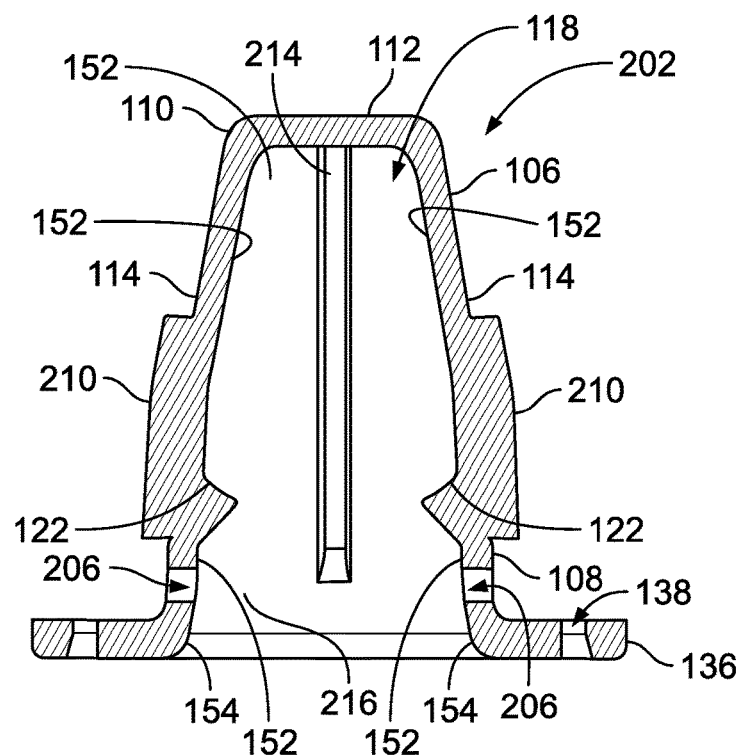
FIG. 17 is a cross-sectional view of the body of FIG. 16.

With reference to FIGS. 16 and 17, the body 202 includes depressions 212 on each side wall 114 to help create the engagement features 122 that securely couple the fastener assembly 200 to the subassembly B (see FIG. 14). This example is non-limiting and the body 202 can include any number of depressions 212. Further, the chamber 118 includes two interior rib features 214 (only one is seen in FIG. 17) that extend from the inner walls 152 and allow for alignment with the parallel wall features 172 on the rib tower 166 (see FIG. 13). The interior rib features 214 extend from a bottom 216 of the chamber 118 and angle concavely toward each other. This configuration allows for a tighter tolerance between the body 202 and the rib tower 166 during assembly.

Figure 18:
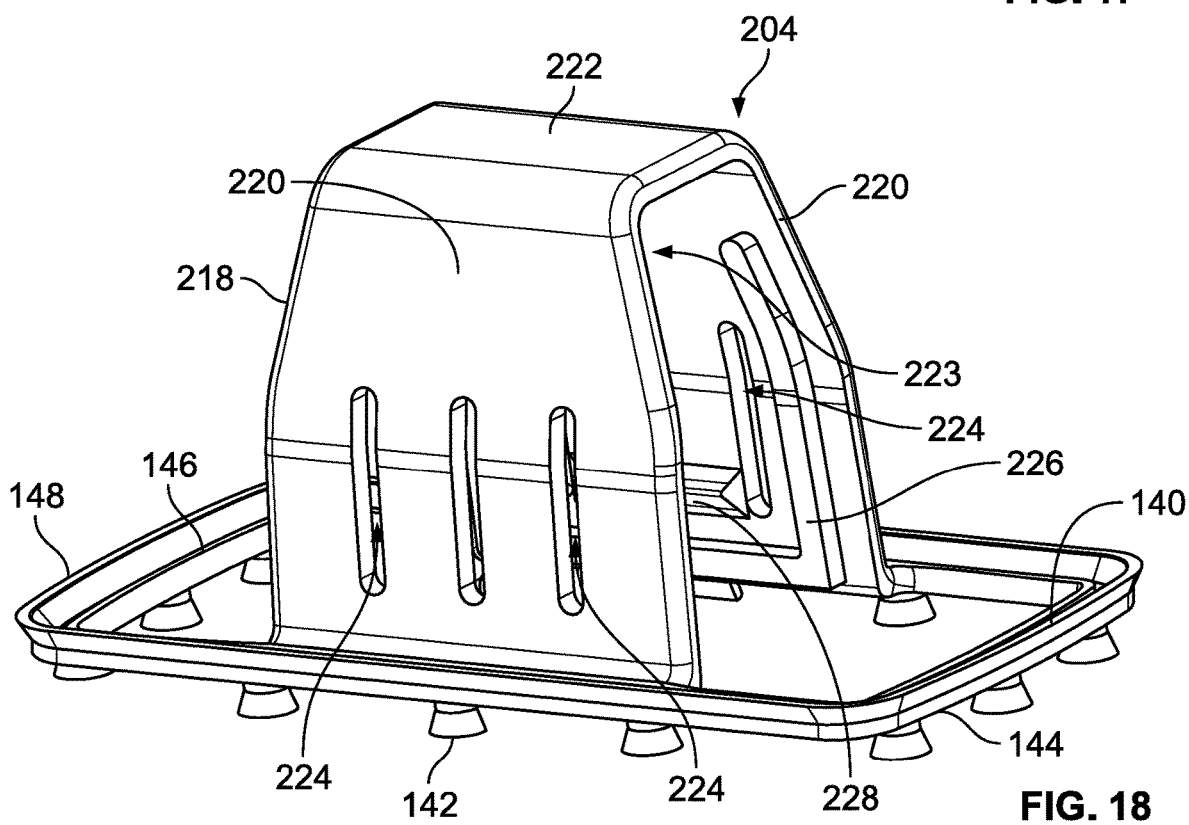
FIG. 18 is an isometric view of a gasket of the fastener assembly of FIG. 15.
Figure 19:
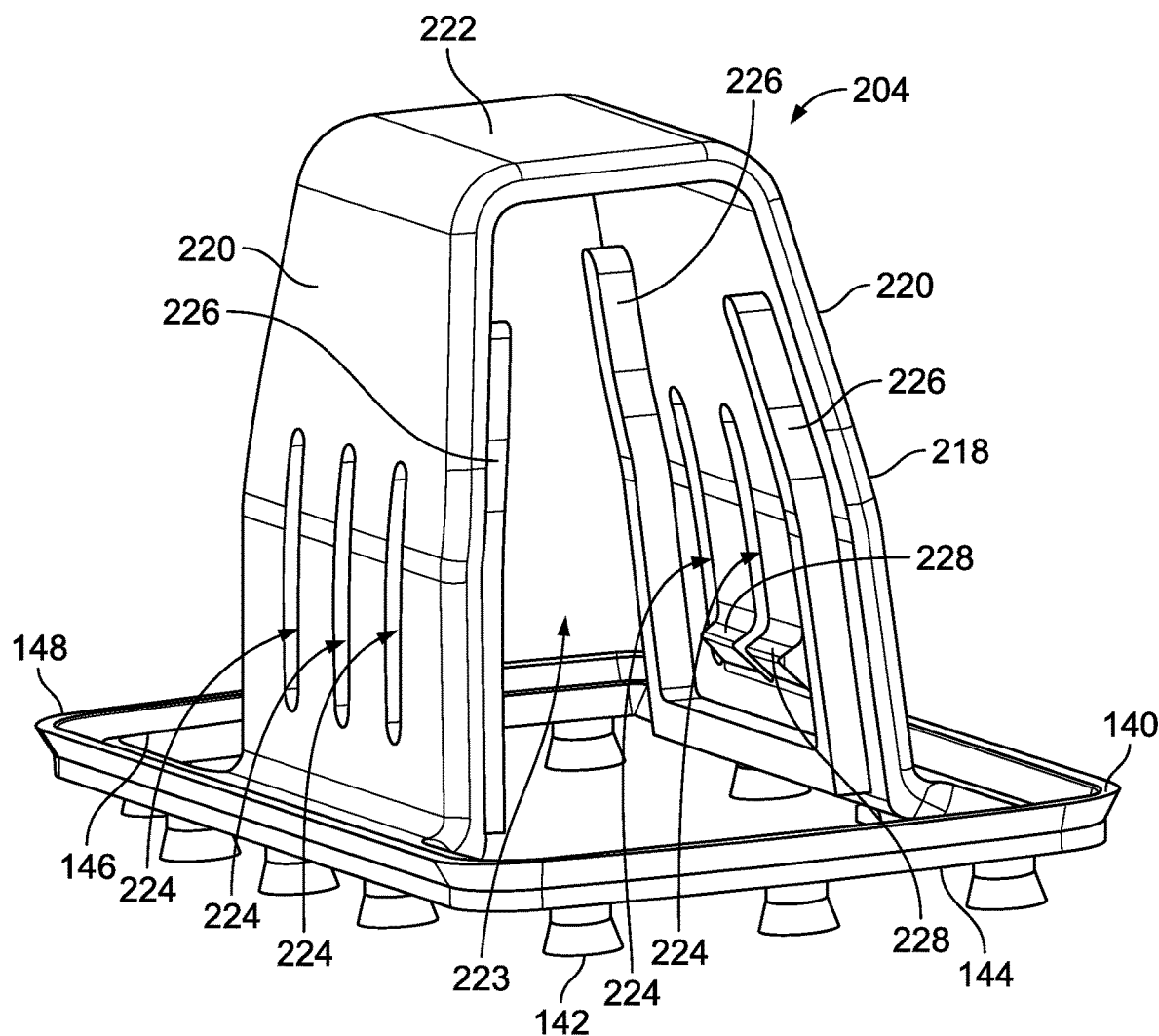
FIG. 19 is another isometric view of the gasket of FIG. 18.

Referring now to FIGS. 18 and 19, the gasket 204 is shown separated from the fastener assembly 200. The gasket 204 includes a support structure 218 that connects with the sealing rim 140. The support structure 218 includes two side walls 220 and a top wall 222 that comprise an interior area 223 with an upside-down U-shaped cross-sectional profile therebetween. The side walls 220 include a plurality of apertures 224 that align with the extrusions 210 of the body 202. The extrusions 210 can extend through the apertures 224 and align flush with the gasket 204. In an alternative embodiment, the extrusions 210 can extend completely through the apertures 224 and past the side walls 220 of the gasket 204. The gasket 204 comprises interior features 226 positioned in the interior area 223 that mate with the cut out portions 206 of the body 202 during molding of the gasket 204. Further, the gasket 204 includes triangular protrusions 228 that extend into the interior area 223 of the gasket 204. The triangular protrusions 228 mate with the depressions 212 on the body 202.

Figure 20:
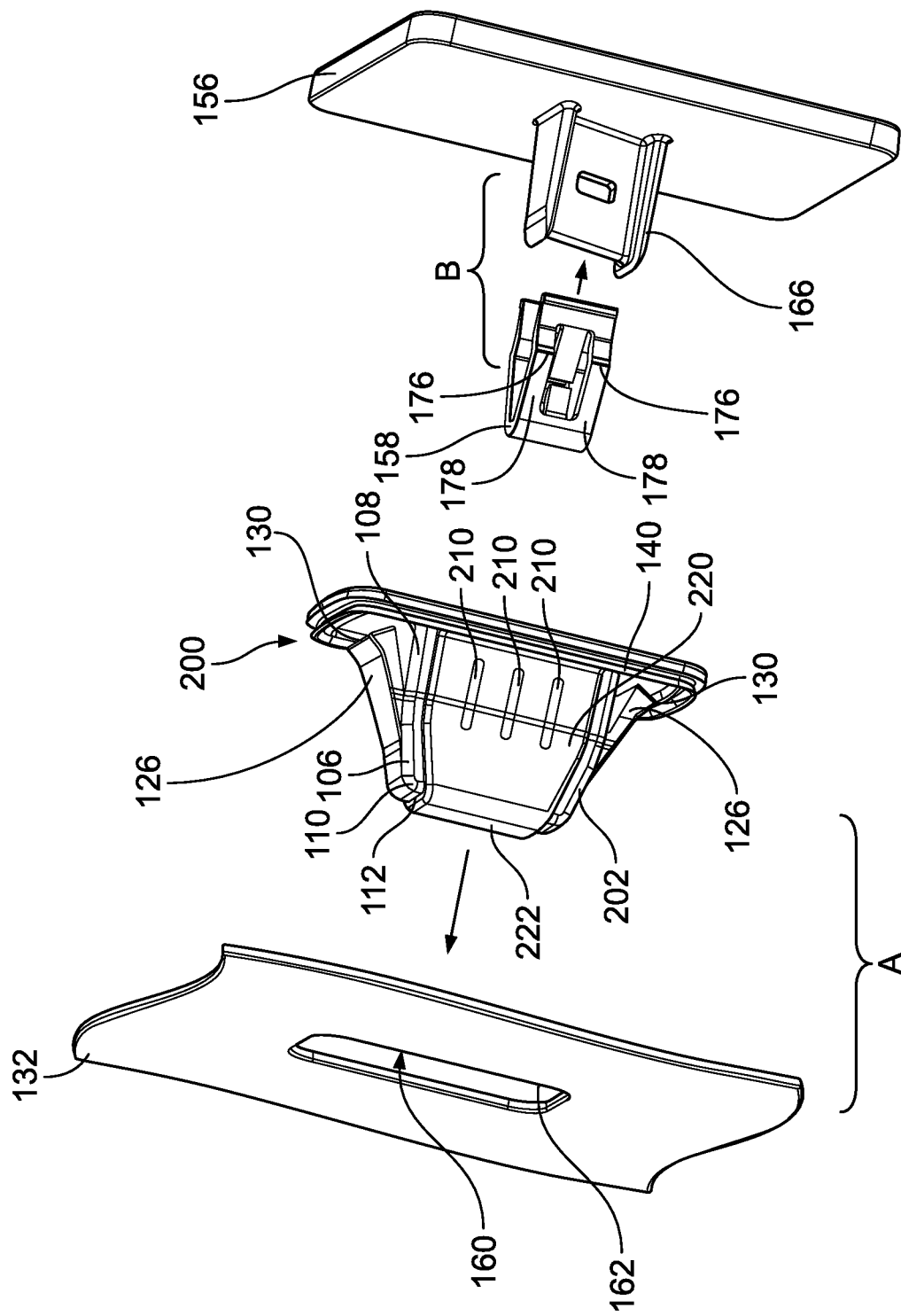
FIG. 20 is an isometric exploded view of the fastener assembly of FIG. 15 aligned with a first component and a second component.
Figure 21:
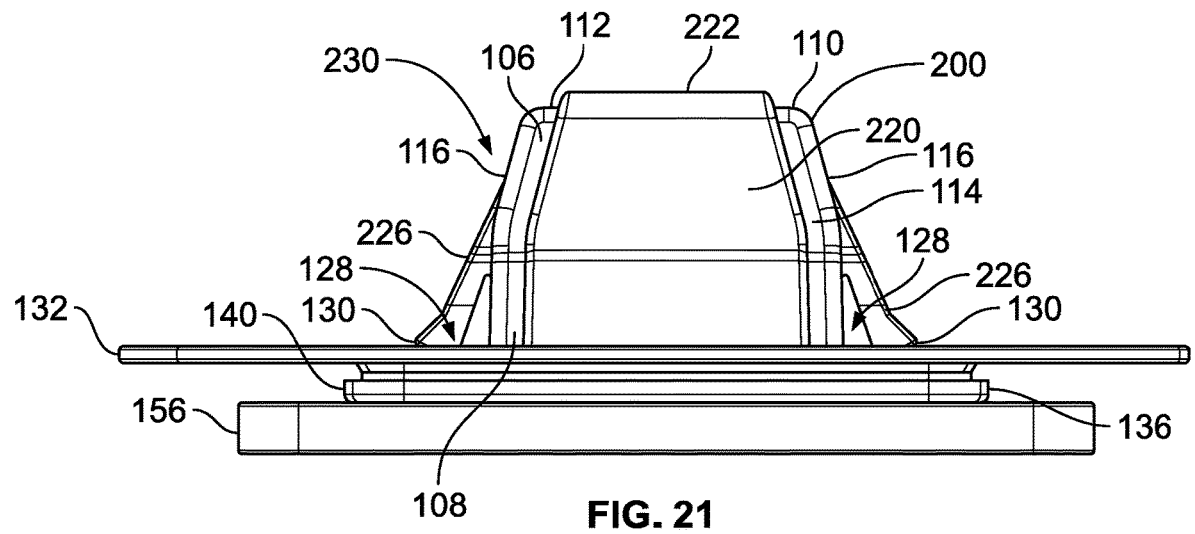
FIG. 21 is a front view of a fastening system comprising the fastener assembly of FIG. 20 coupled with the first and second components.

With reference to FIGS. 20 and 21, the fastener assembly 200 is installed in a similar process as outlined above with respect to the fastener assembly 100. The internal edges 162 of the first component 132 are secured under the lateral retaining arms 126 while the engagement features 122 couple with the knees 176 of the clip 158 (see FIG. 17). Therefore, the first component 132 and the second component 156 can be secured together using the fastener assembly 200 to create a fastening system 230.

Referring again to FIGS. 16, 20, and 21, the fastener assembly 200 design allows for easier installation with regards to the cut out portions 206. The cut out portions 206 allow for the hanging feature 208 to flex in and out of the body 202. During installation of subassembly B, the hanging feature 208 is able to flex outwardly as the clip 158 and rib tower 166 are inserted into the fastener assembly 200. Once inserted, the hanging feature flexes back to its original position and engages with the knees 176 of the clip 158. Because of the flexing capabilities of the fastener assembly 200, installation forces to install the fastener assembly 200 can be reduced.

Figure 22:
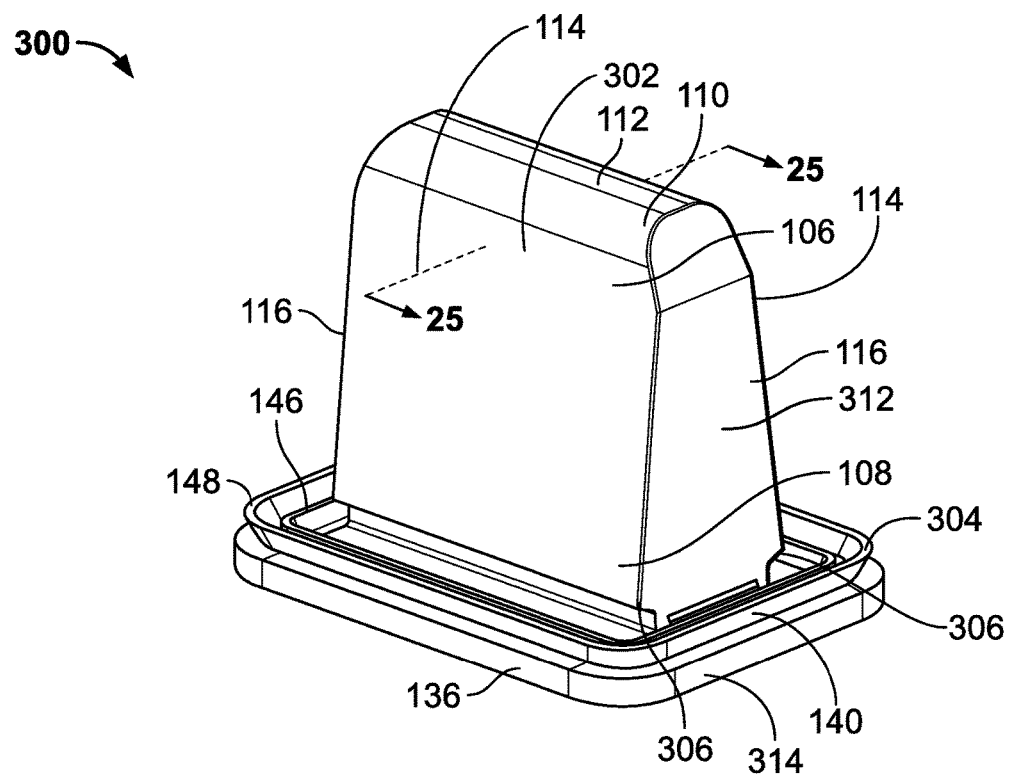
FIG. 22 is an isometric view of a fastener assembly, according to yet another embodiment of the present disclosure.

Referring now to FIG. 22, like reference numbers are used with respect to another embodiment of a fastener assembly 300. The fastener assembly 300 includes a body 302 and a gasket 304 that sealingly couples to the body 302. The body 302 may be formed of a rigid material, such as a hard plastic, and the gasket 304 may be formed of a softer material, such as rubber or another elastomeric material. In at least one embodiment, the body 302 may first be integrally formed and molded, e.g., through an injection molding process. The gasket 304 may be overmolded directly onto the body 302. However, in other embodiments, the gasket 304 may be molded separately and attached to the body 302 in a separate step.

Figure 23:
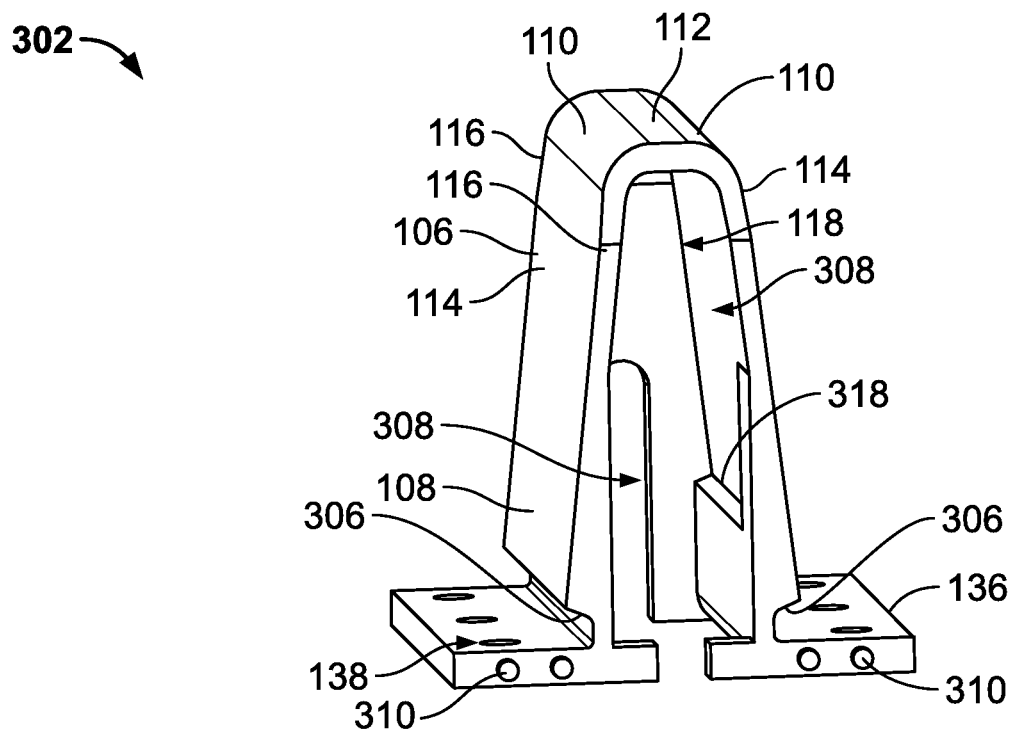
FIG. 23 is an isometric lateral view of a body of the fastener assembly of FIG. 22.

With reference to FIG. 23, the body 302 is shown detached from the gasket 304. The fastener assembly 300 comprises front retaining arms 306 that extend from the side walls 114 of the body 302. The front retaining arms 306 extend outwardly at an angle at the lower end 108 of the body 302. Further, the front retaining arms 306 are used to lock the fastener assembly 300 within the internal edges 162 of the first component 132, in a similar fashion as described above with respect to the lateral retaining arms 126 of the fastener assembly 100 (see FIG. 26). The body 302 comprises cutouts 308 positioned on each of the lateral walls 116. In addition, posts 310 extend from the flange 136 of the body 302 to cooperate with the gasket 304.

Figure 24:
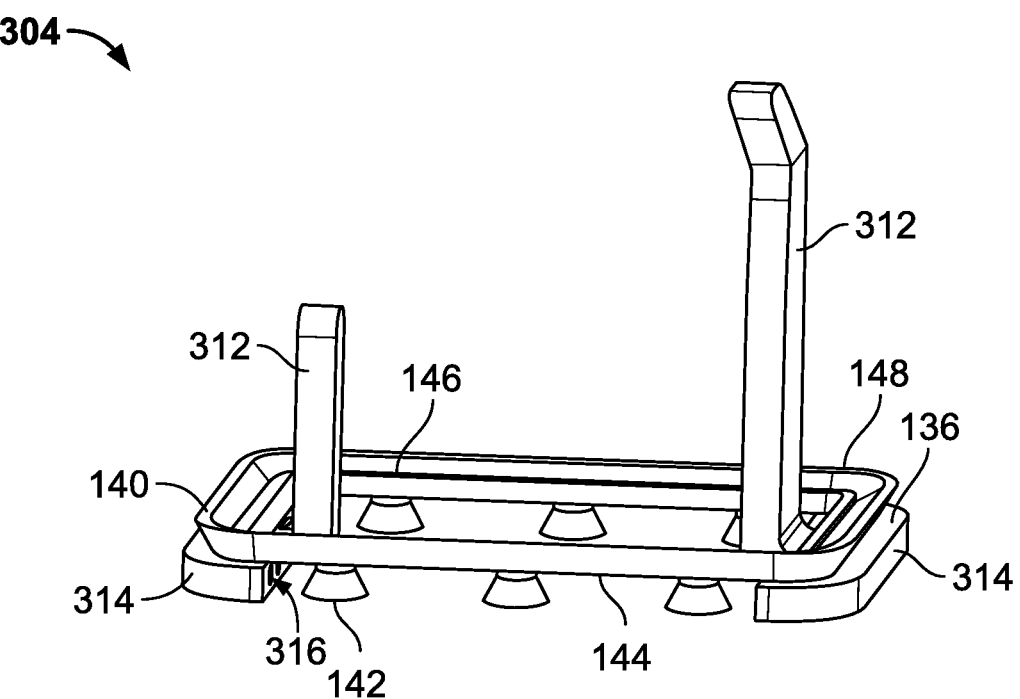
FIG. 24 is an isometric view of a gasket of the fastener assembly of FIG. 22.

Referring to FIG. 24, the gasket 304 is shown separated from the fastener assembly 300. The gasket 304 include supports 312 that extend from the sealing rim 140. The supports 312 are positioned to mate with the cutouts 308 disposed on the body 302. Additionally, the gasket 304 comprises an extension 314 of the flange 136 of the body 302. Holes 316 receive the posts 310 of the body 302 to further secure the gasket 304 to the body 302. In some embodiments, the gasket 304 can be molded with the body 302 to comprise a single fastener assembly.

Figure 25:
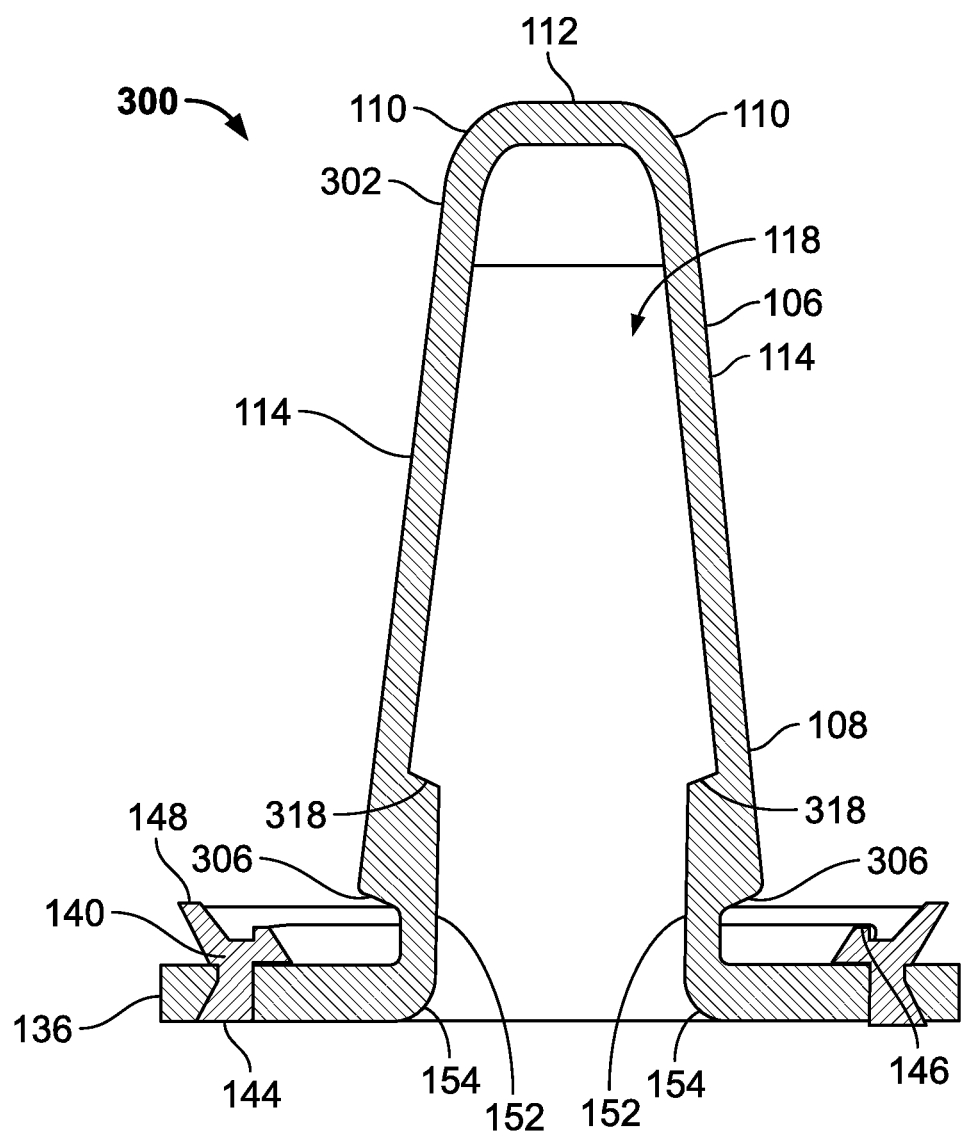
FIG. 25 is a cross-sectional view of the fastener assembly taken through lines 25-25 of FIG. 22.

With reference to FIG. 25, engagement features 318 are positioned in the chamber 118 of the body 302. In the present embodiment, the engagement features 318 extend inwardly toward the side walls 114 to receive the knee 176 of the clip 158 (see FIG. 26). The engagement features 318 operate in a similar fashion as the engagement features 122 of the fastener assembly 100 in order to securely hold subassembly B in position (see FIG. 14).

Figure 26:
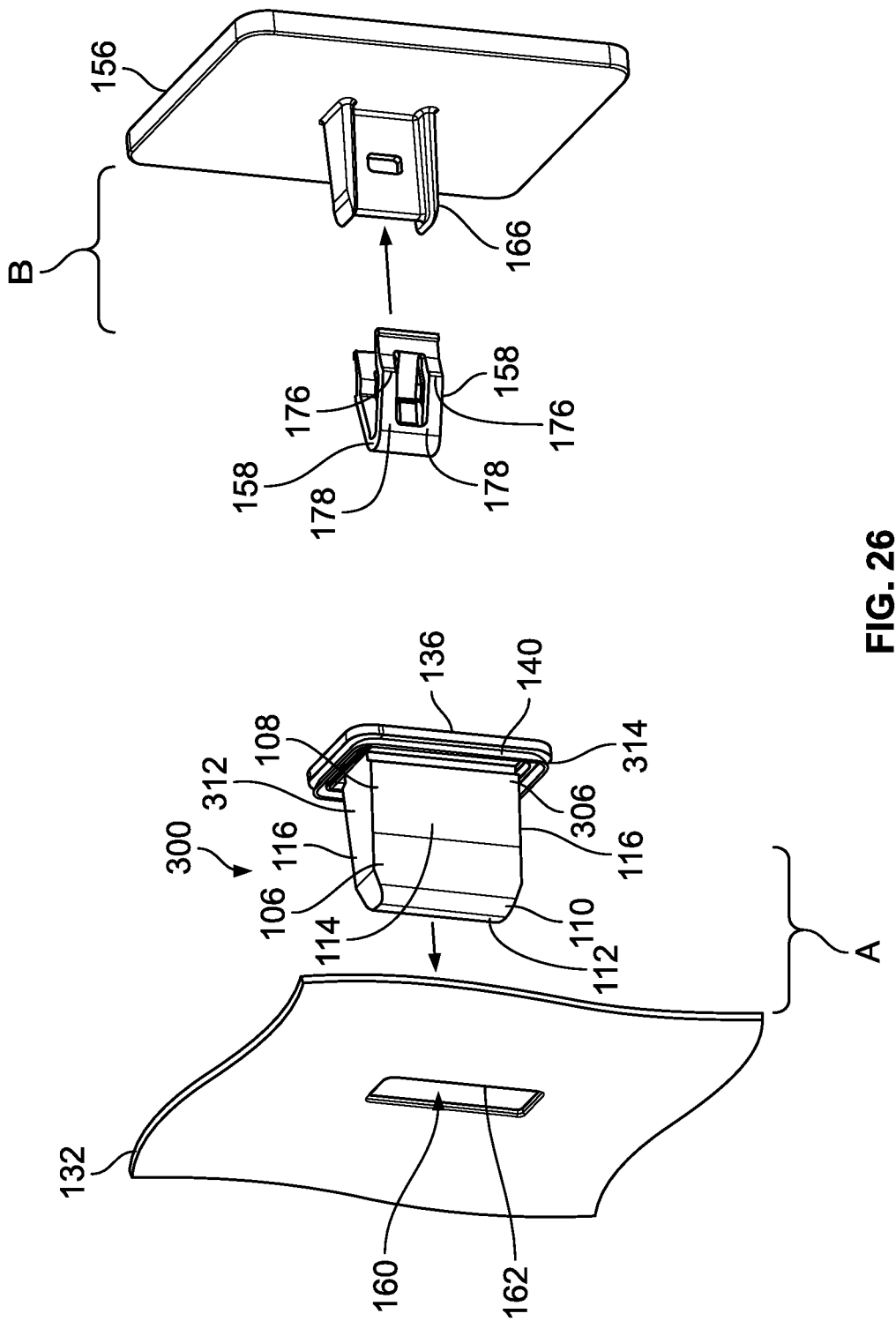
FIG. 26 is an isometric exploded view of the fastener assembly of FIG. 22 aligned with a first component and a second component.
Figure 27:
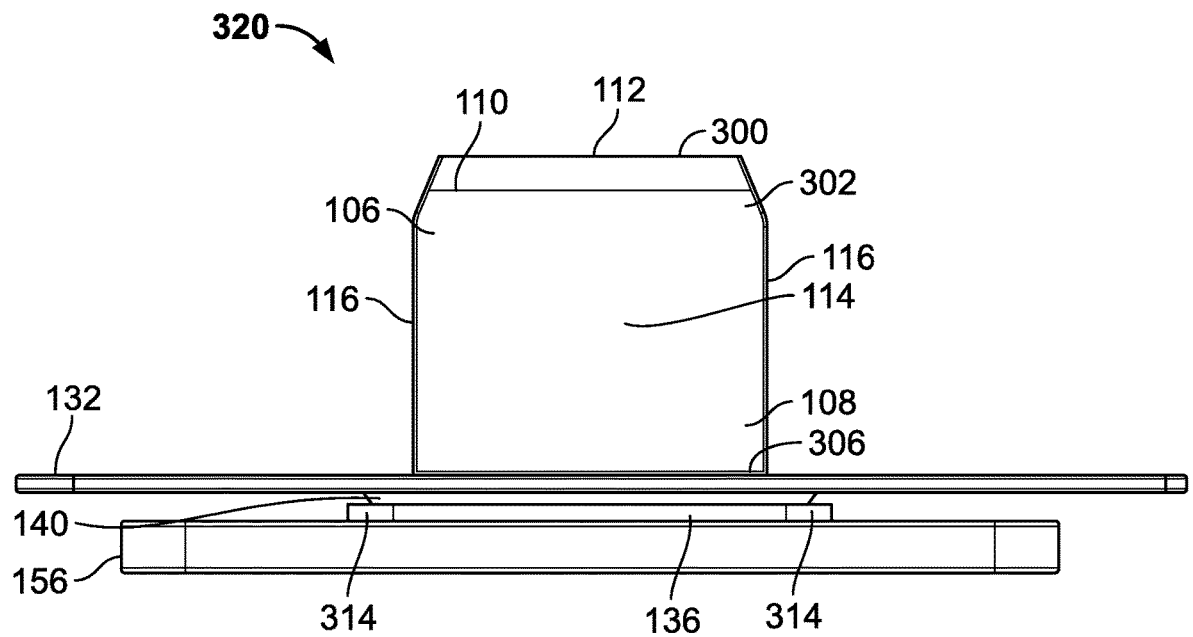
FIG. 27 is a front view of a fastening system, according to yet another embodiment of the present disclosure.

Referring to FIGS. 25-27, the fastener assembly 300 is installed in a similar fashion as outlined above with respect to the fastener assembly 100. The internal edges 162 of the first component 132 are secured under the front retaining arms 306 while the engagement features 318 couple with the knees 176 of the clip 158. As a result, the first component 132 and the second component 156 can be secured together using the fastener assembly 300 to create a fastening system 320. Additionally, once the rib tower 166 and the clip 158 are inserted, the front retaining arms 306 flex outwardly over the first component 132 to add additional strength to the fastener assembly 300. The fastener assembly 300 design allows for easier manufacturing during the molding and tooling process.

Figure 28:
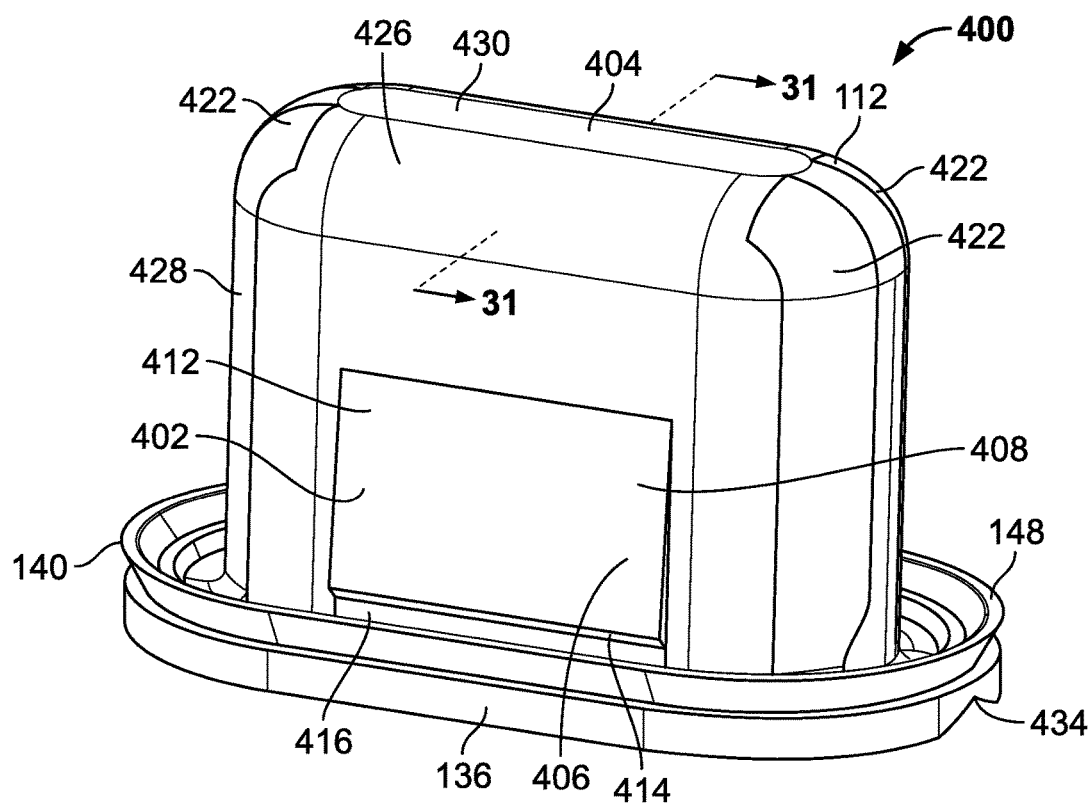
FIG. 28 is a front, top, right isometric view of a fastener assembly, according to another embodiment of the present disclosure.

Referring now to FIG. 28, like reference numbers are used with respect to another embodiment of a fastener assembly 400. The fastener assembly 400 includes a body 402 and a gasket 404 that sealingly couples to the body 402. The body 402 may be formed of a rigid material, such as a hard plastic, and the gasket 404 may be formed of a softer material, such as rubber or another elastomeric material. In at least one embodiment, the body 402 may first be integrally formed and molded, e.g., through an injection molding process. The gasket 404 may then be overmolded directly onto the body 402. However, in other embodiments, the gasket 404 may be molded separately and attached to the body 402 in a separate step.

Figure 29:
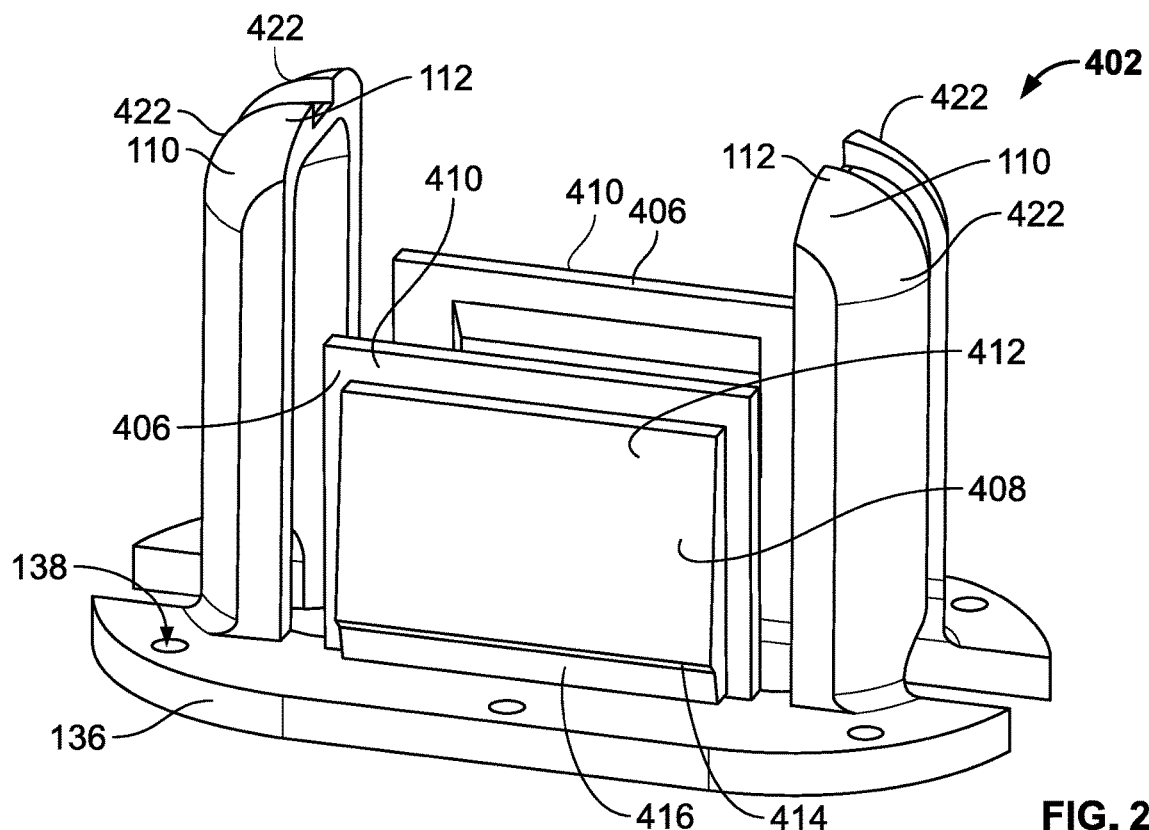
FIG. 29 is an isometric view of a body of the fastener assembly of FIG. 28.

Referring to FIG. 29, the body 402 is shown detached from the gasket 404. The body 402 includes a pair of front walls 406 that are positioned on opposite sides. The front walls 406 include front faces 408 that are offset from rear faces 410. The front faces 408 angle outwardly from a top 412 of the front face 408 to form front retaining arms 414 positioned at a bottom 416 of the front faces 408. The front retaining arms 414 extend from the body 402 in a similar fashion as the front retaining arms 306 of the fastener assembly 300 (see FIG. 23). The front retaining arms 414 are used to lock the first component 132 to the body 402 (see FIG. 33).

Figure 31:
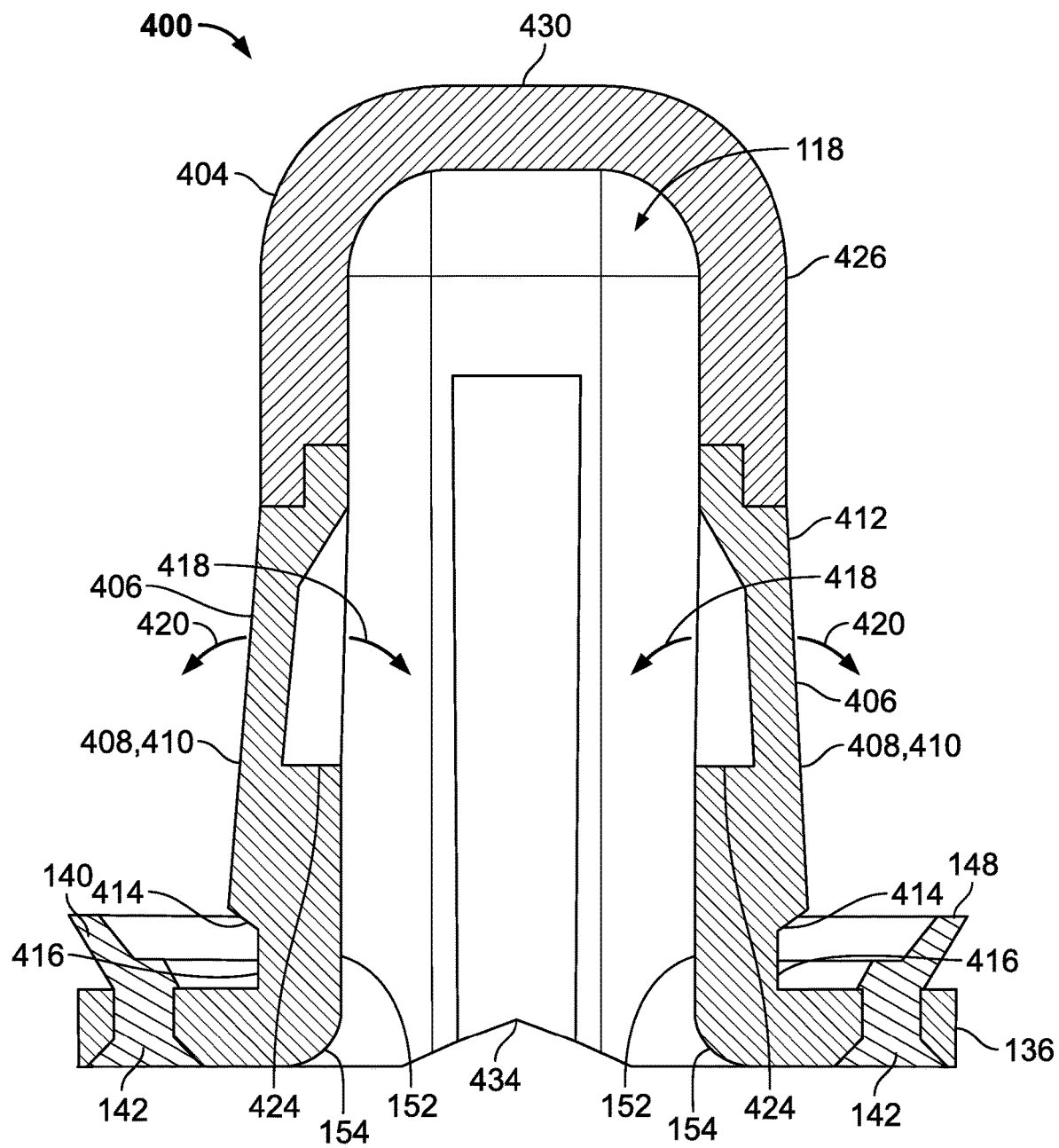
FIG. 31 is a cross-sectional view of the fastener assembly taken through line 31-31 of FIG. 28.

With reference to FIG. 31, the front faces 408 and the rear faces 410 are designed to be able to flex in different directions. During installation, the faces 408, 410 flex inwardly, as depicted by arrow 418, to allow the front retaining arms 414 to snap in place over the internal edges 162 of the first component 132 (see FIG. 32). Further, once subassembly B is inserted into the fastener assembly 400, the faces 408, 410 flex outwardly, as depicted by arrow 420, due to the insertion of the clip 158 and rib tower 166 (see FIG. 32). This outward flex causes the fastener assembly 400 to securely hold the first component 132 in place during use. Once subassembly B has been inserted into the fastener assembly 400, it may be difficult to remove the first component 132 from the fastener assembly 400.

Referring again to FIG. 29, the body 402 further comprises side walls 422 positioned on each corner of the body 402. The side walls 422 help support the body 402 during manufacturing and use of the fastener assembly 400. Turning to FIG. 31, engagement features 424 are positioned on the inner walls 152 of the chamber 118. The engagement features 424 extend into the front walls 406 of the body 402. In the present embodiment, the engagement features 424 are perpendicular to the front walls 406, however, the engagement features 424 can be angled at any degree to engage with the knees 176 of the clip 158 (see FIG. 32). The engagement features 424 are similar to the engagement features 318 on the fastener assembly 300 (see FIG. 25).

Figure 30:
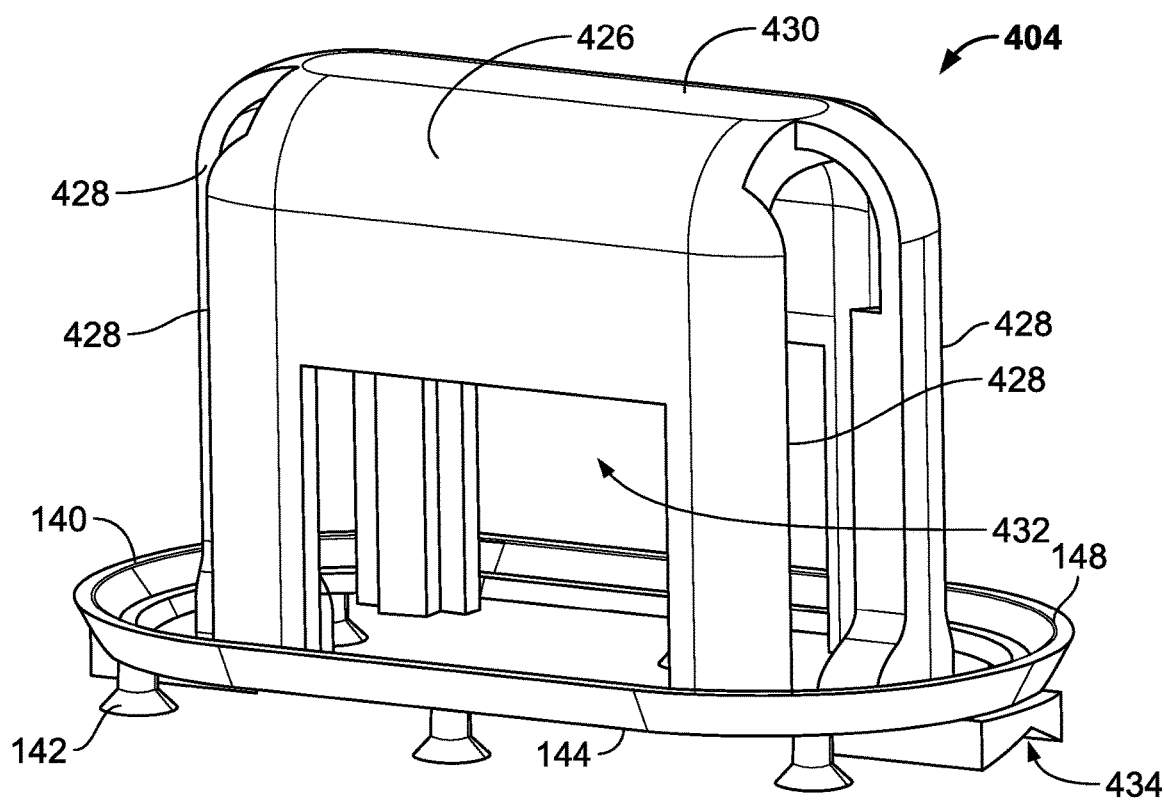
FIG. 30 is anisometric view of a gasket of the fastener assembly of FIG. 28.

With reference to FIG. 30, the gasket 404 is shown separated from the fastener assembly 400. The gasket 404 includes a support structure 426 that connects with the sealing rim 140. The support structure 426 comprises a plurality of legs 428 that support a roof 430 with an interior area 432 therebetween. The gasket 404 may be molded with the body 402 to comprise a single fastener assembly. The fastener assembly 400 may include a divot 434 disposed at the ends of the fastener assembly 400. The divot 434 is a flex point for the fastener assembly 400 and allows the front walls 406 to flex easily during installation.

Figure 32:
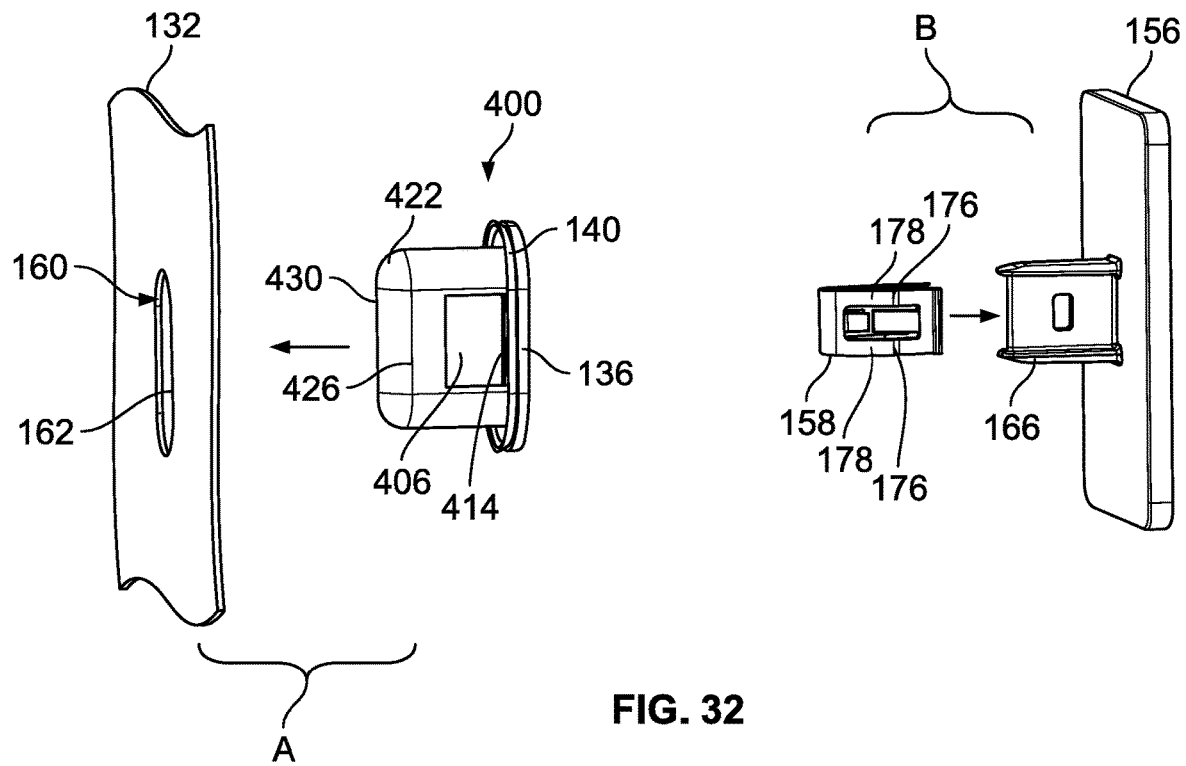
FIG. 32 is an isometric exploded view of the fastener assembly of FIG. 28 aligned with a first component and a second component.
Figure 33:
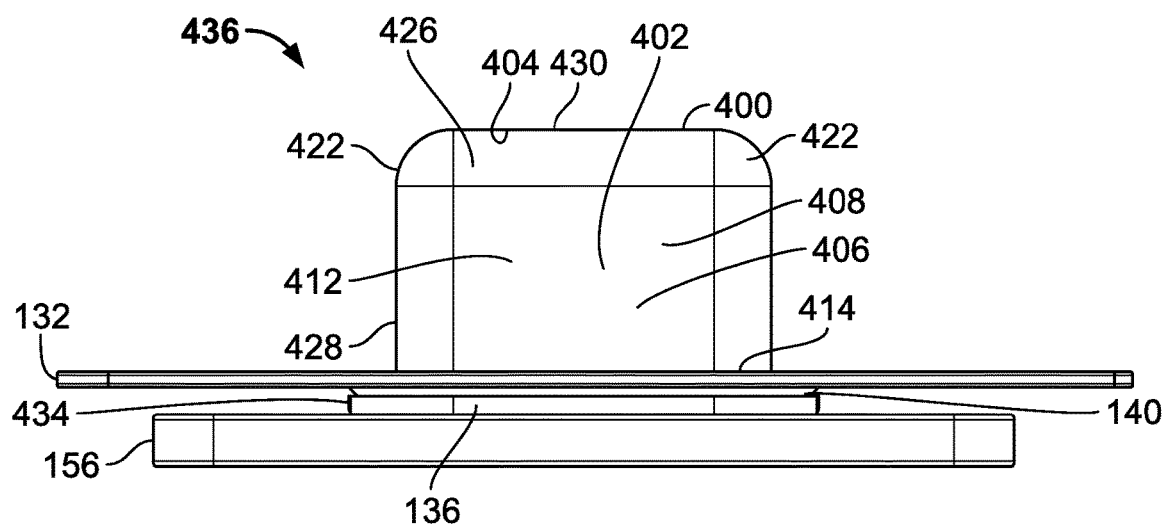
FIG. 33 is a front view of a fastening system comprising the fastener assembly of FIG. 28 and the first and second components in an assembled configuration.

Referring to FIGS. 32 and 33, the fastener assembly 400 is installed in a similar process as outlined above with respect to the fastener assembly 100. The internal edges 162 of the first component 132 are secured under the front retaining arms 414 while the engagement features 424 are coupled with the knees 176 of the clip 158 (see FIG. 31). Therefore, the first component 132 and the second component 156 can be secured together using the fastener assembly 400 to create a fastening system 436.

As described above, embodiments of the present disclosure provide sealed fastener assemblies 100, 200, 300, 400 that are used to securely couple components 132, 156 together. Further, the fastener assemblies 100, 200, 300, 400 can be easily manufactured, installed, provide desired retention strength, and block water ingress. Moreover, the fastener assemblies 100, 200, 300, 400 can be used a number of times before wear is noticed and can produce an audible sound when installed to help the end user during assembly.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

Various features of the disclosure are set forth in the following claims.

The invention claimed is:

1. A fastener assembly that is configured to securely couple to one or more components, the fastener assembly, comprising:
   a body including opposing side walls and opposing lateral walls, the side walls and lateral walls, in combination, defining an interior volume;
   a flange extending from a lower end of the body and including a plurality of apertures; and
   a gasket secured to the flange,
   wherein the body is configured to securely couple to a clip,
   wherein the body includes one or more features that are configured to cooperate with one or more reciprocal features of the clip to increase retention strength, and
   wherein the body comprises lead-in edges that curve from a bottom of the body to inner walls of the body.

2. The fastener assembly of claim 1, wherein the features that cooperate with the clip are disposed on the inner walls of the body.

3. The fastener assembly of claim 2, wherein the body includes two retaining arms that are configured to secure the component to the fastener assembly.

4. The fastener assembly of claim 3, wherein the component is secured under tips of the retaining arms.

5. The fastener assembly of claim 2, wherein the lead-in edges guide the clip into the body of the fastener assembly.

6. The fastener assembly of claim 5, wherein the gasket is overmolded directly onto the body and is formed of a softer material than the body.

7. The fastener assembly of claim 6, wherein the body is formed of a rigid polymer.

8. The fastener assembly of claim 5, wherein the clip is attached to a rib tower, and
   wherein the rib tower has parallel wall features that align with the inner walls of the body.

9. The fastener assembly of claim 5, wherein the gasket includes a sealing rim, which blocks water ingress from seeping through the components.

10. A fastener assembly, comprising:
    a body including opposing side walls and opposing lateral walls, the side walls and lateral walls, in combination, defining an interior volume;
    a gasket including a sealing rim that secures to a flange and securely seals to a first component; and
    at least two engagement features disposed on inner walls of the body to cooperate with one or more reciprocal features of a second component,
    wherein the flange extends from a lower end of the body and includes a plurality of apertures,
    wherein the body comprises one or more retaining arms to securely fasten to the first component, and is configured to receive the second component, and
    wherein the one or more retaining arms extend outwardly from a lateral wall and create a void between the one or more retaining arms and the lateral wall when in an extended configuration.

11. The fastener assembly of claim 10, wherein the body includes a plurality of cutouts.

12. The fastener assembly of claim 11, wherein a main wall of the body flexes during installation to allow for easier assembly.

13. The fastener assembly of claim 12, wherein the first component is locked into place after the second component is inserted into the interior volume of the body.

14. The fastener assembly of claim 13, wherein the inner walls of the body comprise one or more internal rib features that align with the second component.

15. The fastener assembly of claim 11, wherein the gasket includes a support structure with various features that interconnect with the body during a molding process.

16. The fastener assembly of claim 15, wherein the gasket is overmolded directly onto the body and is formed of a soft durometer material.

* * * * *